(12) United States Patent
Mullins et al.

(10) Patent No.: US 8,379,028 B1
(45) Date of Patent: Feb. 19, 2013

(54) RIGWEB

(75) Inventors: David H. Mullins, Kensington, CA (US); James Murphy, Sonoma, CA (US); Rita Garcia, Oakland, CA (US)

(73) Assignee: Pixar, Emeryville, CA (US)

( * ) Notice: Subject to any disclaimer, the term of this patent is extended or adjusted under 35 U.S.C. 154(b) by 965 days.

(21) Appl. No.: 12/433,591

(22) Filed: Apr. 30, 2009

(51) Int. Cl.
*G06T 13/00* (2006.01)

(52) U.S. Cl. .......................... 345/473; 345/419; 345/474

(58) Field of Classification Search .................. 345/419, 345/473, 474
See application file for complete search history.

(56) References Cited

U.S. PATENT DOCUMENTS

| | | | |
|---|---|---|---|
| 7,202,869 B2 * | 4/2007 | Tooley et al. | 345/473 |
| 7,580,854 B2 * | 8/2009 | Carter et al. | 705/7.31 |
| 7,650,294 B1 * | 1/2010 | Carter et al. | 705/7.25 |
| 7,782,324 B2 * | 8/2010 | Goldfarb | 345/473 |
| 7,928,985 B2 * | 4/2011 | Goldfarb | 345/473 |
| 8,094,156 B2 * | 1/2012 | Smith | 345/473 |
| 8,139,068 B2 * | 3/2012 | Isner et al. | 345/474 |
| 2006/0274070 A1 * | 12/2006 | Herman et al. | 345/474 |
| 2010/0030578 A1 * | 2/2010 | Siddique et al. | 705/3 |

OTHER PUBLICATIONS

Baran et al. "Automatic Rigging and Animation of 3D Characters". ACM 2007.*

* cited by examiner

*Primary Examiner* — Kimbinh T Nguyen
(74) *Attorney, Agent, or Firm* — Kilpatrick Townsend & Stockton LLP

(57) ABSTRACT

In various embodiments, techniques are provided for collaborating and developing a body of knowledge for animation rigging for use in CGI and computer-aided animation. In an embodiment, a computer system may be used to facilitate the creation of rigging for computer-generated models. Using one or more graphical user interfaces, a user can provide the computer system with information defining a set of controls for a computer-generated model. The user can provide the computer system with information providing a description of each control in the set of controls. The user can also provide the computer system with information providing an example of use of each control in the set of controls. A body of knowledge for a standard rig can be created based on the information defining the set of controls, the description of each control, and the example of use of each control using the computer system. A user or group of users can interact with the body of knowledge to formalized definitions of artistic or technical content.

28 Claims, 16 Drawing Sheets ns in the computer-
RIGWEB

BACKGROUND

This disclosure relates to computer-generated imagery (CGI) and computer-aided animation. More specifically, this disclosure relates to techniques for collaborating and developing a body of knowledge for animation rigging for use in CGI and computer-aided animation.

With the wide-spread availability of computers, computer graphics artists and animators can rely upon computers to assist in production process for creating animations and computer-generated imagery (CGI). This may include using computers to have physical models be represented by virtual models in computer memory. Typically, two-dimensional (2D) or three-dimensional (3D) computer-aided animation combines 2D/3D models of objects and programmed movement of one or more of the models. In 3D computer animation, the first step is typically the object modeling process. Objects can be sculpted much like real clay or plaster, working from general forms to specific details, for example, with various sculpting tools. Models may then be constructed, for example, out of geometrical vertices, faces, and edges in a 3D coordinate system to represent the objects. These virtual models can then be manipulated using computers to, for example, simulate physics, design aesthetic actions such as poses or other deformations, crate lighting, coloring and paint, or the like, of characters or other elements of a computer animation display.

Pixar is one of the pioneering companies in the computer-generated imagery (CGI) and computer-aided animation industry. Pixar is more widely known as Pixar Animation Studios, the creators of animated features such as "Toy Story" (1995) and "Toy Story 2" (1999), "A Bugs Life" (1998), "Monsters, Inc." (2001), "Finding Nemo" (2003), "The Incredibles" (2004), "Cars" (2006), "Ratatouille" (2007), and others. In addition to creating animated features, Pixar develops computing platforms and tools specially designed for computer-aided animation and CGI. One such example is now known as PhotoRealistic RenderMan, or PRMan for short. PRMan is a photorealistic RenderMan-compliant rendering software system based on the RenderMan Interface Specification (RISpec) which is Pixar's technical specification for a standard communications protocol (or interface) between 3D computer graphics programs and rendering programs. PRMan is produced by Pixar and used to render their in-house 3D animated movie productions. It is also available as a commercial product licensed to third parties, sold as part of a bundle called RenderMan Pro Server, a RenderMan-compliant rendering software system developed by Pixar based on their own interface specification. Other examples include tools and plug-ins for programs such as the AUTODESK MAYA high-end 3D computer graphics software package from AutoDesk, Inc. of San Rafael, Calif.

One core functional aspect of PRMan can include the use of a "rendering engine" to convert geometric and/or mathematical descriptions of objects into images. This process is known in the industry as "rendering." For movies, other animated features, shorts, and special effects, a user (e.g., a skilled computer graphics artist) can specify the geometric or mathematical description of objects to be used in the rendered image or animation sequence, such as characters, props, background, or the like. In some instances, the geometric description of the objects may include a number of animation control variables (avars) and values for the avars. An animator may also pose the objects within the image or sequence and specify motions and positions of the objects over time to create an animation.

As such, the production of CGI and computer-aided animation may involve the extensive use of various computer graphics techniques to produce a visually appealing image from the geometric description of an object that may be used to convey an essential element of a story or provide a desired special effect. One of the challenges in creating these visually appealing images is the can be the balancing of a desire for a highly-detailed image of a character or other object with the practical issues involved in allocating the resources (both human and computational) required to produce those visually appealing images.

Therefore, one issue with the production process is the time and effort involved when a user undertakes to model the geometric description of an object and the model's associated avars, rigging, shader variables, paint data, or the like. It may take several hours to several days for the user to design, rig, pose, paint, or otherwise prepare a model that can be used to produce the visually desired look. This involvement in time and effort can limit that ability of the user to create enough variants of the model for use in different stages of the production process or in a single scene to covey particular element of the story or to provide the desired visual effect. Additionally, artistic control over the look of a model or its visual effect when placed in a scene may also be lost by some attempts at reducing the time and effect in preparing a model that rely too much on automated procedural creation of models.

Accordingly, what is desired is to solve one or more problems which may be discussed herein relating to creating objects for use in CGI and computer-aided animation. Additionally, what is desired is to reduce some drawbacks which may be discussed herein relate to creating these objects.

BRIEF SUMMARY

In various embodiments, techniques are provided for the development of a body of knowledge associated with animation rigging used in CGI and computer-aided animation.

In an embodiment, a computer system may be used to facilitate the creation of rigging for computer-generated models. Using one or more graphical user interfaces, a user can provide the computer system with information defining a set of controls for a computer-generated model. The user can provide the computer system with information specifying a description of each control in the set of controls. The user can further provide the computer system with information specifying an example of use for each control in the set of controls. A body of knowledge for a rig is then created using the computer system based on the information defining the set of controls, the description of each control, and the example of use for each control. The body of knowledge may be maintained by the computer system for use by individuals acting in artistic and technical capacities to create computer-generated models. These individuals may collaborate using methods provided herein to develop and update the body of knowledge maintained by the computer system thereby enabling more effective use of resources in CGI and computer-aided animation.

In some embodiments, rigging for a computer-generated model can be designated as a standard rig. The standard rig may be used for development or creation of other computer-generated models. In an embodiment, a body of knowledge for a standard rig may include a hierarchy of controls for the model. The hierarchy of controls may represent a common set of controls, their names, and their relationships. A body of knowledge for a standard rig may include a description of the functionality of each control and the purpose of each control. In an embodiment, a body of knowledge for a standard rig may include a set of images used to depict use of a control in the hierarchy with a computer-generated model. In another embodiment, a body of knowledge for a standard rig may include a movie used to depict use of the control in the hierarchy with a computer-generated model. In an embodiment, a body of knowledge for a standard rig may include a set of annotations made by a user, such as an articulator, specifying technical information for a control in the set of controls. A computer system that maintains the body of knowledge for a standard rig may incorporate annotations from users into the body of knowledge for the standard rig. In an embodiment, a set of annotations made by a users, such as an animator, may be incorporated into the body of knowledge for the standard rig specifying artistic or aesthetic elements for a control in the set of controls.

In various embodiments, users can interact with one or more graphical user interfaces generated by a computer system used to facilitate the creation of rigging for computer-generated models based on a body of knowledge for a standard rig. In an embodiment, one or more graphical user interfaces may be generated that are substantially similar to a modeling tool used by a user that enable the user to interact with the set of controls in a manner substantially similar to the modeling tool. In an embodiment, one or more graphical user interfaces may enable a user to include, edit, or update information in a body of knowledge for a standard rig about a control in the set of controls. In some embodiments, one or more graphical user interfaces may be generated based on a body of knowledge for a standard rig that enable a user to interact with a control in the set of controls to view the description of the control. One or more graphical user interfaces may be generated based on a body of knowledge for a standard rig that enable a user to interact with a control in the set of controls to view the example of use of the control.

In further embodiments, a computer system used to facilitate the creation of rigging for computer-generated models may incorporate a set of electronic communications into a body of knowledge for a standard rig. In one embodiment, one or more graphical user interfaces can be generated based on a body of knowledge for a standard rig that enable users to schedule events and create notifications, alerts, monitors, or the like. One or more graphical user interfaces may enable electronic communication between users that is relevant to a control in a set of controls, documentation, examples, or other information associated with a body of knowledge for a standard rig. In another embodiment, one or more graphical user interfaces may enable a user to associate an electronic document, such as images, movies, presentations, or the like, with a portion of a body of knowledge for a standard rig.

In still further embodiments, a computer system can be used for collaborating to define a computer-generated model. A body of knowledge for a computer-generated model can be created, accessed, and developed via user interface generated by a computer system according to techniques provided within this disclosure. In an embodiment, a body of knowledge for a standard rig can be developed to specify information defining a set of controls for a computer-generated character, information proving a description of each control, and information providing an example of use of each control. A user or group of users can interact with a body of knowledge for a standard rig via one or more user interfaces to formalize artistic content associated with the computer-generated character and technical content associated with the computer-generated character. The computer system may manage scheduling, electronic communication, documentation procedures, or the like for the user or group of users. Artistic content and technical content can be stored using the computer system. The computer system may enable the formalization of artist content or technical content to occur in substantially real time, such as during a presentation or meeting.

Other embodiments and/or examples of processes, methods, systems, apparatuses, devices, computer program products, and computer-readable media may be provided that incorporate techniques found within this disclosure, including those specifically as discussed above.

A further understanding of the nature of and equivalents to the subject matter of this disclosure (as wells as any inherent or express advantages and improvements provided) should be realized by reference to the remaining portions of this disclosure, any accompanying drawings, and the claims in addition to the above section.

BRIEF DESCRIPTION OF THE DRAWINGS

In order to reasonably describe and illustrate those innovations, embodiments, and/or examples found within this disclosure, reference may be made to one or more accompanying drawings. The additional details or examples used to describe the one or more accompanying drawings should not be considered as limitations to the scope of any of the claimed inventions, any of the presently described embodiments and/or examples, or the presently understood best mode of any innovations presented within this disclosure.

DETAILED DESCRIPTION OF THE DISCLOSED EMBODIMENTS

In various embodiments, techniques are provided for the development of a body of knowledge associated with animation rigging used in CGI and computer-aided animation.

In an embodiment, a computer system may be used to facilitate the creation of rigging for computer-generated models. Using one or more graphical user interfaces, a user can provide the computer system with information defining a set of controls for a computer-generated model. The user can provide the computer system with information specifying a description of each control in the set of controls. The user can further provide the computer system with information specifying an example of use for each control in the set of controls. A body of knowledge for a rig is then created using the computer system based on the information defining the set of controls, the description of each control, and the example of use for each control. The body of knowledge may be maintained by the computer system for use by individuals acting in artistic and technical capacities to create computer-generated models. These individuals may collaborate using methods provided herein to develop and update the body of knowledge maintained by the computer system thereby enabling more effective use of resources in CGI and computer-aided animation.

In order to better understand embodiments or examples presented within this disclosure, aspects of at least one environment related to various embodiments may first be described.

Figure 1:
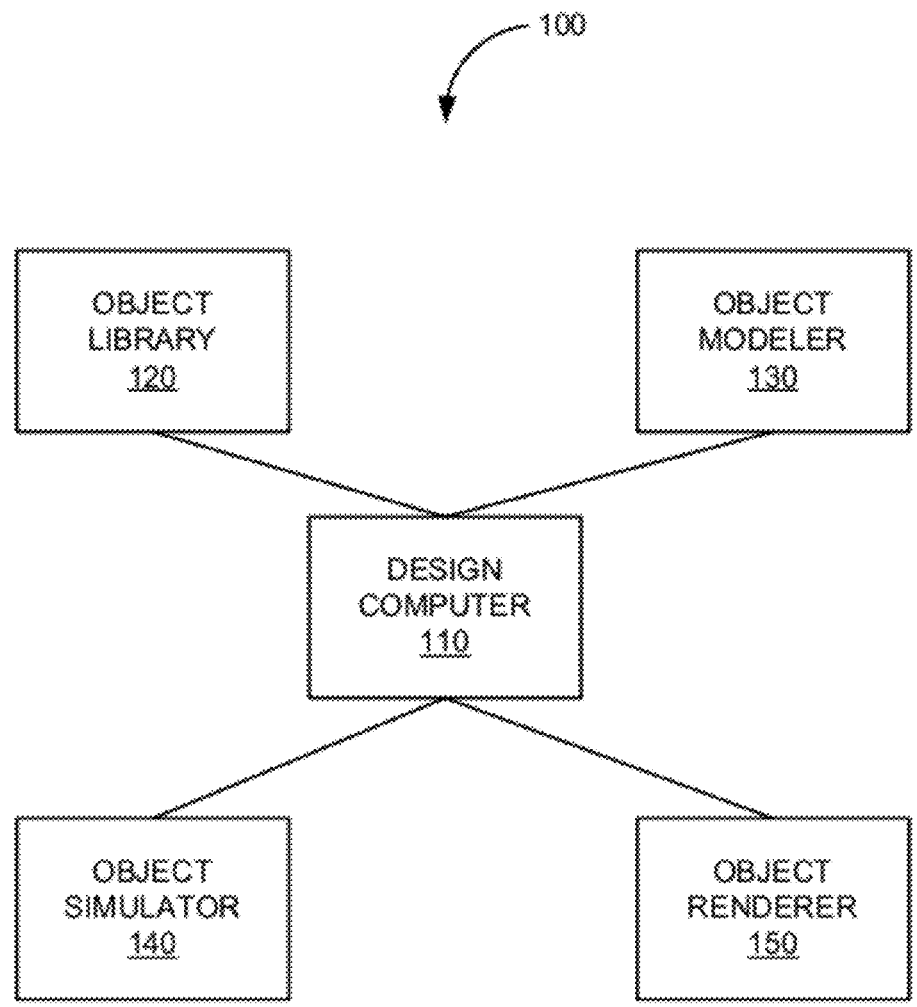
FIG. 1 is a simplified block diagram of a system for creating computer graphics imagery (CGI) and computer-aided animation.

FIG. 1 is a simplified block diagram of system 100 for creating computer graphics imagery (CGI) and computer-aided animation. In this example, system 100 includes design computer 110, object library 120, object modeler 130, object simulator 140, and object render 150.

Design computer 110 can include hardware and software elements for designing CGI and assisting with computer-aided animation. Design computer 110 may be embodied as a PC, laptop, workstation, mainframe, cluster, embedded device, computer graphics device, or the like. Design computer 110 may be used at various stages (e.g., creating, editing, simulating, animating, rendering, etc.) of a production process to produce CGI and animation. For example, a user of design computer 110 may employ one or more software programs as tools to create and manipulate objects within a computer-generated scene. An articulator may utilize design computer 110 to specify controls and animation variables for one or more objects. An animator may utilize design computer 110 to specify motion and position of one or more objects over time using the controls and animation variables to produce an animation.

Object library 120 can include hardware and/or software elements for storing information related to objects used by design computer 110 during the various stages of a production process to produce CGI and animation. Some examples of object library 120 can include a file, a database, or other storage devices and mechanisms. An object stored in object library 120 can include any entity that has an n-dimensional (e.g., 2D or 3D) surface geometry. The shape of the object can include a set of points or locations in space (e.g., object space) that make up the object's surface. Topology of an object can include the connectivity of the surface of the object (e.g., the genus or number of holes in an object) or the vertex/edge/face connectivity of an object.

Object modeler 130 can include hardware and/or software elements used by design computer 110 for modeling one or more objects. Some examples of object modeler 130 are the high-end 3D computer graphics and 3D modeling software packages 3D STUIO MAX and AUTODESK MAYA produced by Autodesk, Inc. of San Rafael, Calif. A model created by object modeler 130 can include a description of the shape of an object.

Features, such as non-uniform rational B-splines or NURBS, polygons and subdivision surfaces (or SubDivs) may be used to describe the shape of an object. In general, polygons are a widely used model medium due to their relative stability and functionality. Polygons can also act as the bridge between NURBS and SubDivs. NURBS are used mainly for their ready-smooth appearance and generally respond well to deformations. SubDivs are a combination of both NURBS and polygons representing a smooth surface via the specification of a coarser piecewise linear polygon mesh. A single object may have several different models that describe its shape. Object modeler 130 may generate model data (e.g., 2D and 3D model data) for use by other elements of system 100 or that can be stored in object library 120.

Object simulator 140 can include hardware and/or software elements for simulating one or more objects. Object simulator 140 may generate simulation data, for example, using a physics engine or physics processing unit (PPU/GPGPU) and one or more physically-based numerical techniques. In general, a physics engine can include a computer program that simulates one or more physics models (e.g., a Newtonian physics model), using variables such as mass, velocity, friction, wind resistance, or the like. The physics engine may simulate and predict effects under different conditions that would approximate what happens to an object according to the physics model.

Object renderer 150 can be any hardware and/or software for rendering one or more objects to produce computer-generated images and animation. Rendering is the process of generating an image from a model, by means of computer programs. As discussed above, the model can include a description of an object in a strictly defined language or data structure. The model typically includes geometry, viewpoint, texture, lighting, and shading information. Object renderer 150 may generate digital images or raster graphics images. For example, object renderer 150 may generate still images, animations, motion picture sequences, or the like of objects stored in object library 120.

A rendered image can be understood in terms of a number of visible features, such as shading—how the color and brightness of a surface varies with lighting; texture-mapping—a method of applying detail to surfaces; bump-mapping—a method of simulating small-scale bumpiness on surfaces; fogging/participating medium—how light dims when passing through non-clear atmosphere or air; shadows—the effect of obstructing light; soft shadows—varying darkness caused by partially obscured light sources; reflection—mirror-like or highly glossy reflection; transparency or opacity—sharp transmission of light through solid objects; translucency—highly scattered transmission of light through solid objects; refraction—bending of light associated with transparency; diffraction—bending, spreading and interference of light passing by an object or aperture that disrupts the ray; indirect illumination—surfaces illuminated by light reflected off other surfaces, rather than directly from a light source (also known as global illumination); caustics (a form of indirect illumination)—reflection of light off a shiny object, or focusing of light through a transparent object, to produce bright highlights on another object; depth of field—objects appear blurry or out of focus when too far in front of or behind the object in focus; motion blur—objects appear blurry due to high-speed motion, or the motion of the camera; non-photorealistic rendering—rendering of scenes in an artistic style, intended to look like a painting or drawing; or the like.

In some embodiments, rigging for a computer-generated model can be designated as a standard rig. The standard rig may be used for development or creation of other computer-generated models. In an embodiment, a body of knowledge for a standard rig may include a hierarchy of controls for the model. The hierarchy of controls may represent a common set of controls, their names, and their relationships. A body of knowledge for a standard rig may include a description of the functionality of each control and the purpose of each control. In an embodiment, a body of knowledge for a standard rig may include a set of images used to depict use of a control in the hierarchy with a computer-generated model. In another embodiment, a body of knowledge for a standard rig may include a movie used to depict use of the control in the hierarchy with a computer-generated model. In an embodiment, a body of knowledge for a standard rig may include a set of annotations made by a user, such as an articulator, specifying technical information for a control in the set of controls. A computer system that maintains the body of knowledge for a standard rig may incorporate annotations from users into the body of knowledge for the standard rig. In an embodiment, a set of annotations made by a users, such as an animator, may be incorporated into the body of knowledge for the standard rig specifying artistic or aesthetic elements for a control in the set of controls.

In various embodiments, users can interact with one or more graphical user interfaces generated by a computer system used to facilitate the creation of rigging for computer-generated models based on a body of knowledge for a standard rig. In an embodiment, one or more graphical user interfaces may be generated that are substantially similar to a modeling tool used by a user that enable the user to interact with the set of controls in a manner substantially similar to the modeling tool. In an embodiment, one or more graphical user interfaces may enable a user to include, edit, or update information in a body of knowledge for a standard rig about a control in the set of controls. In some embodiments, one or more graphical user interfaces may be generated based on a body of knowledge for a standard rig that enable a user to interact with a control in the set of controls to view the description of the control. One or more graphical user interfaces may be generated based on a body of knowledge for a standard rig that enable a user to interact with a control in the set of controls to view the example of use of the control.

In further embodiments, a computer system used to facilitate the creation of rigging for computer-generated models may incorporate a set of electronic communications into a body of knowledge for a standard rig. In one embodiment, one or more graphical user interfaces can be generated based on a body of knowledge for a standard rig that enable users to schedule events and create notifications, alerts, monitors, or the like. One or more graphical user interfaces may enable electronic communication between users that is relevant to a control in a set of controls, documentation, examples, or other information associated with a body of knowledge for a standard rig. In another embodiment, one or more graphical user interfaces may enable a user to associate an electronic document, such as images, movies, presentations, or the like, with a portion of a body of knowledge for a standard rig.

In still further embodiments, a computer system can be used for collaborating to define a computer-generated model. A body of knowledge for a computer-generated model can be created, accessed, and developed via user interface generated by a computer system according to techniques provided within this disclosure. In an embodiment, a body of knowledge for a standard rig can be developed to specify information defining a set of controls for a computer-generated character, information proving a description of each control, and information providing an example of use of each control. A user or group of users can interact with a body of knowledge for a standard rig via one or more user interfaces to formalize artistic content associated with the computer-generated character and technical content associated with the computer-generated character. The computer system may manage scheduling, electronic communication, documentation procedures, or the like for the user or group of users. Artistic content and technical content can be stored using the computer system. The computer system may enable the formalization of artist content or technical content to occur in substantially real time, such as during a presentation or meeting.

Figure 2:
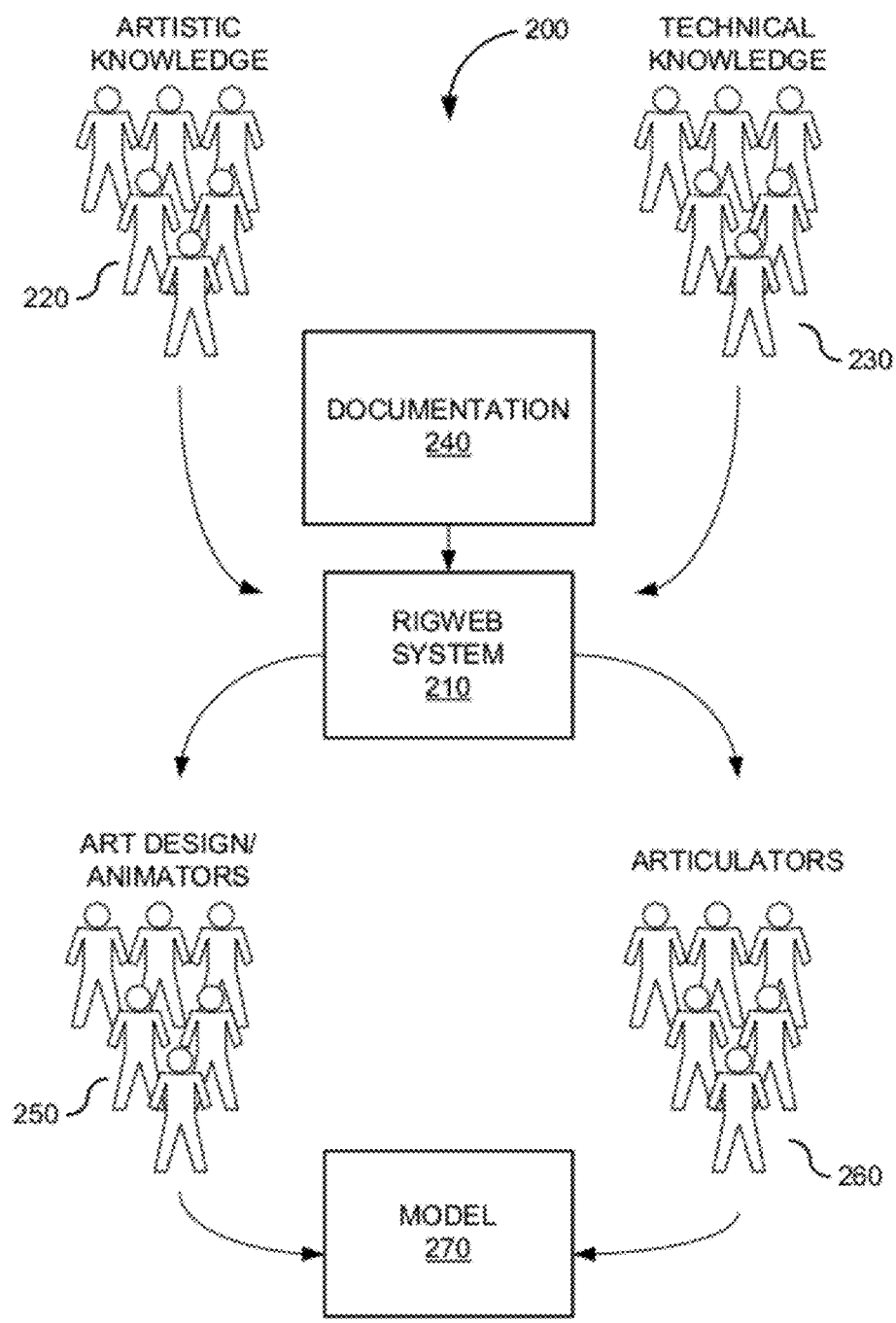
FIG. 2 is an illustration of a collaboration process for creating computer-generated characters.

FIG. 2 is an illustration of collaboration process 200 for creating computer-generated characters. In this example, collaboration process 200 includes the use of rigweb system 100 to facilitate collaboration process 200. Rigweb system 210 can include any hardware and/or software elements that maintain a body of knowledge for a computer-generated object. A body of knowledge for a computer-generated object can include artist content and technical content. Some examples of artistic content include information describing a desired appearance of a model, such as through drawings, sketches, images, or the like. Further examples of artistic content can include information describing a desired manner in which the model acts, interacts with other objects, reacts to other objects or forces, or the like. Some examples of technical content include information describing features or tools that implement a desired appearance of a model. Further examples of technical content can include features or tools that implement a desired manner in which the model acts, interacts with other objects, reacts to other objects or forces, or the like. The artistic content and the technical content may be stored in variety of computer and human-readable formats. Rigweb system 210 further can include elements that facilitate collaboration between those having artistic content relevant to the computer-generated object and those having technical content relevant to the computer-generated object.

In an embodiment, one or more individuals 220 having artistic knowledge relevant to a computer-generated object may incorporated that knowledge into a body of knowledge for the object using rigweb system 210. The artistic knowledge may include shape, size, dimensions, structure, color schemes, the overall look and feel of the object, how the object should move, how the object should interact with other objects, or the like. The one or more of individuals 220 may incorporate artistic content or knowledge into the body of knowledge for the object by uploading existing documentation into rigweb system 210 or directly entering personal knowledge into rigweb system 210.

In an embodiment, one or more individuals 230 having technical knowledge relevant to a computer-generated object may incorporated that knowledge into a body of knowledge for the object using rigweb system 210. The technical knowledge may include programming, scripting, rigging, controls, and other animation variables that enable the object to be animated or otherwise incorporated into a computer-generated scene. One or more of individuals 230 may incorporate technical content or knowledge into the body of knowledge for the object by importing data obtained from external tools, such as modeling applications, into rigweb system 210.

In various embodiments, documentation 240 may be incorporated into a body of knowledge for a computer-generated object using rigweb system 210. Documentation 240 may include artistic or technical knowledge for the object. Documentation 240 may also include an example of artistic content, technical content, or the like. In some embodiments, documentation 240 may include notes or recordings of meetings between individuals 220 and individuals 230, electronic messages relevant to the object, presentations, articles, tutorials, or the like.

In further embodiments, rigweb system 210 may be used to develop new computer-generated objects. For example, a body of knowledge for a computer-generated object may be used as a starting point, much like a template or standard, for the new computer-generated object. In another example, a human model and any associated rigging or controls may be designated as a standard basis when creating new characters. Any prior knowledge, experiences, and examples, of developing human characters may be incorporated in the body of knowledge for the standard object enabling other artists, animators, articulators, or the like to benefit.

In one embodiment, individuals 250 involved as art designers and/or animators may use rigweb 210 to review artistic and technical content associated with an object whose body of knowledge is maintained by rigweb 210. Individuals 250 may use rigweb 210 to create model 270 by referencing one or more standards in rigweb 210 for similar models or objects. In another example, individuals 250 may use rigweb 210 to learn how to interact with controls or other animation variables associated with model 270.

In another embodiment, individuals 260 involved as articulators or other developers may use rigweb 210 to review artistic and technical content associated with an object whose body of knowledge is maintained by rigweb 210. Individuals 260 may use rigweb 210 to create scripts, programming, rigging, controls, or other animations variables for model 270 by referencing one or more standards in rigweb 210 for similar models or objects. In another example, individuals 260 may use rigweb 210 to learn how to interact with controls or other animation variables associated with model 270.

According to various embodiments, rigweb system 210 enables users to main a body of knowledge for computer-generated objects across multiple projects. Thus, users of rigweb system 210 can enjoy access to an evolving information resource from one project to the next. In an embodiment, design or technical decisions made in one project and any associated reasoning for making the decisions can be utilized in another project, saving time, money, and effort. In another embodiment, the design or technical decisions made in one project can be reevaluated efficiently for use in later projects because a record is kept of the associated reasoning for making the given decisions. Therefore, subsequent users of rigweb system 210 may no long be faced to wonder at what was the motivation or reasoning for a given design or technical decision because the information can be documented and accessed using rigweb system 210.

Figure 3:
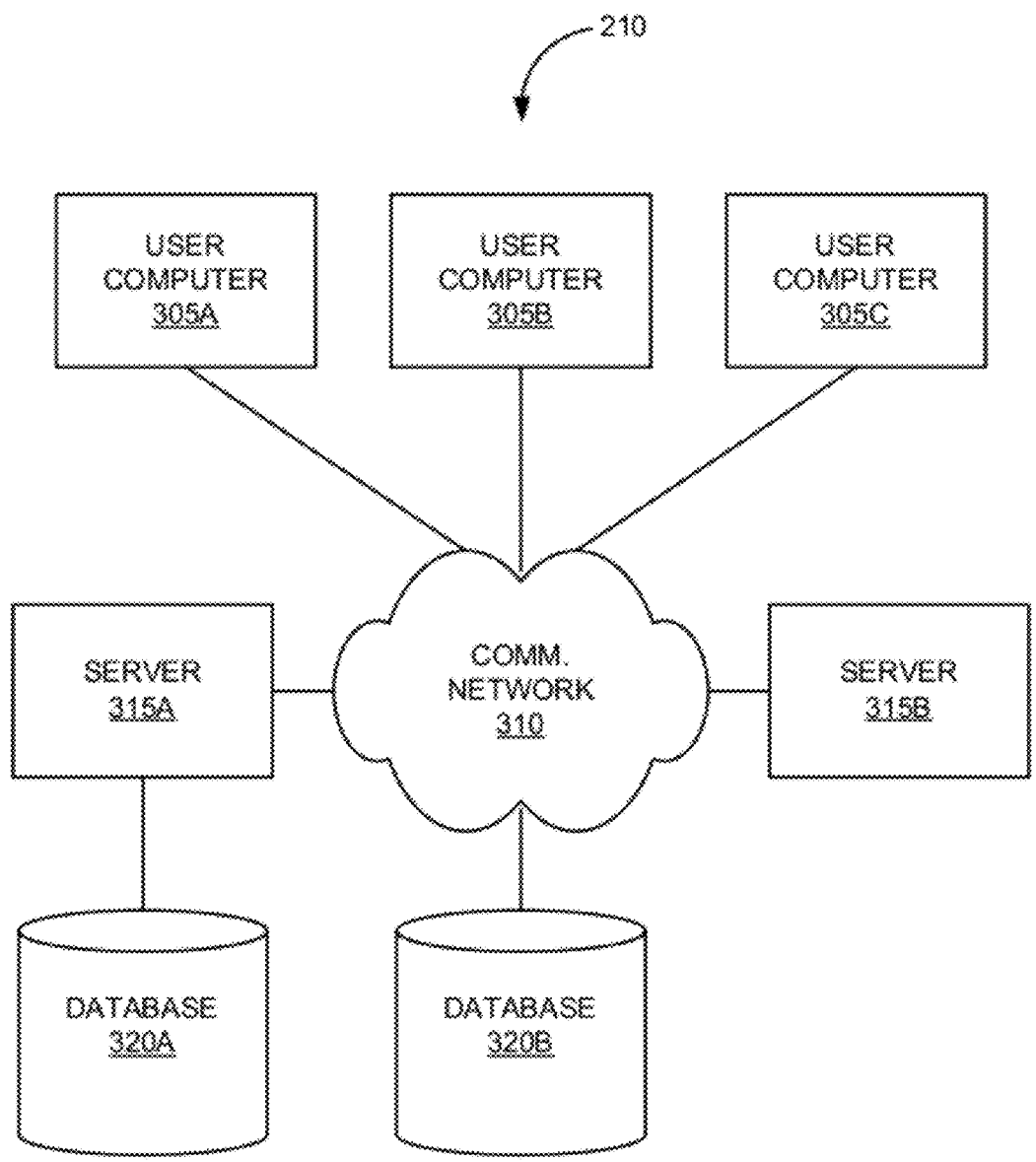
FIG. 3 is a simplified illustration of a rigweb system in an embodiment.

FIG. 3 is a simplified illustration of rigweb system 210 in an embodiment. FIG. 3 is merely illustrative of an embodiment incorporating the present invention and does not limit the scope of the invention as recited in the claims. One of ordinary skill in the art would recognize other variations, modifications, and alternatives.

In one embodiment, rigweb system 210 includes one or more user computers 305 (e.g., computers 305A, 305B, and 305C). User computers 305 can be general purpose personal computers (including, merely by way of example, personal computers and/or laptop computers running any appropriate flavor of Microsoft Corp.'s Windows™ and/or Apple Corp.'s Macintosh™ operating systems) and/or workstation computers running any of a variety of commercially-available UNIX™ or UNIX-like operating systems. These user computers 305 can also have any of a variety of applications, including one or more applications configured to perform methods of the invention, as well as one or more office applications, database client and/or server applications, and web browser applications.

Alternatively, user computers 305 can be any other electronic device, such as a thin-client computer, Internet-enabled mobile telephone, and/or personal digital assistant, capable of communicating via a network (e.g., communications network 310 described below) and/or displaying and navigating web pages or other types of electronic documents. Although the exemplary rigweb system 210 is shown with three user computers, any number of user computers or devices can be supported.

Certain embodiments can operate in a networked environment, which can include communications network 310. Communications network 310 can be any type of network familiar to those skilled in the art that can support data communications using any of a variety of commercially-available protocols, including without limitation TCP/IP, SNA, IPX, AppleTalk, and the like. Merely by way of example, communications network 310 can be a local area network ("LAN"), including without limitation an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks.

Some embodiments can include one or more server computers 315 (e.g., computers 315A and 315B). Each of server computers 315 may be configured with an operating system including without limitation any of those discussed above, as well as any commercially-available server operating systems. Each of server computers 315 may also be running one or more applications, which can be configured to provide services to one or more clients (e.g., user computers 305) and/or other servers (e.g., server computers 315).

Merely by way of example, one of server computers 315 may be a web server, which can be used, merely by way of example, to process requests for web pages that provide one or more user interfaces for interacting with rigweb system 210, requests for electronic documents, or requests for other information from user computers 305. The web server can also run a variety of server applications, including HTTP servers, FTP servers, CGI servers, database servers, Java servers, and the like. In some embodiments, the web server may be configured to serve web pages that can be operated within a web browser on one or more of the user computers 305 to perform methods provided in this disclosure.

Server computers 315, in some embodiments, might include one or more file and or/application servers, which can include one or more applications accessible by a client running on one or more of user computers 305 and/or other server computers 315. Merely by way of example, one or more of server computers 315 can be one or more general purpose computers capable of executing programs or scripts in response to user computers 305 and/or other server computers 315, including without limitation web applications (which might, in some cases, be configured to perform methods provided in the disclosure).

Merely by way of example, a web application can be implemented as one or more scripts or programs written in any programming language, such as Java, C, or C++, and/or any scripting language, such as Perl, Python, or TCL, as well as combinations of any programming/scripting languages. Server computers 315 can also include database servers, including without limitation those commercially available from Oracle, Microsoft, IBM and the like, which can process requests from database clients running on one of user computers 305 and/or another of server computer 315.

In some embodiments, an application server can create web pages dynamically for displaying the information in accordance with one or more embodiments. Data provided by an application server may be formatted as web pages (comprising HTML, XML, Javascript, AJAX, etc., for example) and/or may be forwarded to one of user computers 305 via a web server (as described above, for example). Similarly, a web server might receive web page requests and/or input data from one of user computers 305 and/or forward the web page requests and/or input data to an application server.

In accordance with further embodiments, one or more of server computers 315 can function as a file server and/or can include one or more of the files necessary to implement methods provide in the disclosure incorporated by an application running on one of user computers 305 and/or another of servers 315. Alternatively, as those skilled in the art will appreciate, a file server can include all necessary files, allowing such an application to be invoked remotely by one or more of user computers 305 and/or server computers 315. It should be noted that the functions described with respect to various servers herein (e.g., application server, database server, web server, file server, etc.) can be performed by a single server and/or a plurality of specialized servers, depending on implementation-specific needs and parameters.

In certain embodiments, rigweb system 210 can include one or more databases 320 (e.g., databases 320A and 320B). The location of the database(s) 320 is discretionary: merely by way of example, database 320A might reside on a storage medium local to (and/or resident in) server computer 315A (and/or one or more of user computers 305). Alternatively, database 320B can be remote from any or all of user computers 305 and server computers 315, so long as it can be in communication (e.g., via communications network 310) with one or more of these. In a particular set of embodiments, databases 320 can reside in a storage-area network ("SAN") familiar to those skilled in the art. (Likewise, any necessary files for performing the functions attributed to user computers 305 and server computers 315 can be stored locally on the respective computer and/or remotely, as appropriate). In one set of embodiments, one or more of databases 320 can be a relational database that is adapted to store, update, and retrieve data in response to SQL-formatted commands. Databases 320 might be controlled and/or maintained by a database server, as described above, for example.

Figure 4:
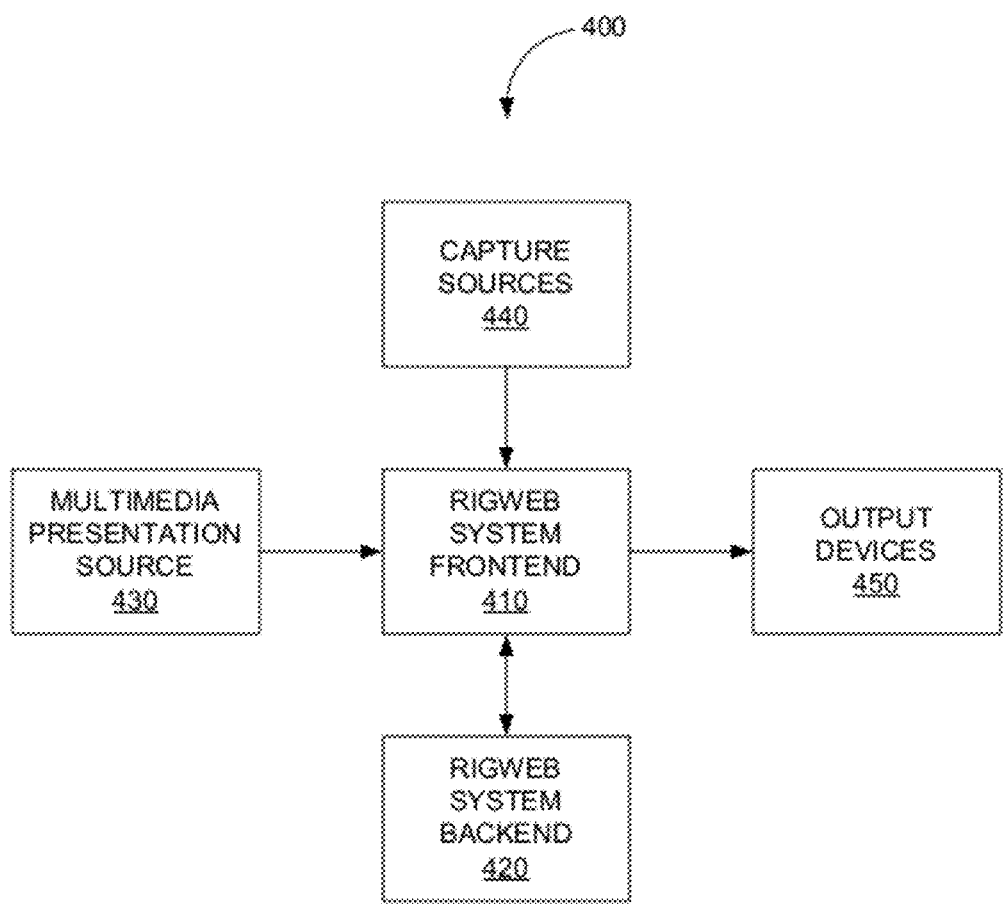
FIG. 4 is a block diagram in an embodiment depicting a system providing a frontend and a backend of a rigweb system in an embodiment.

FIG. 4 is a block diagram in an embodiment depicting system 400 providing a frontend and a backend of rigweb system 210 of FIG. 3. In this example, system 400 includes rigweb system frontend 410 and rigweb system backend 420. In one embodiment, rigweb system frontend 410 can include any hardware and/or software elements for accessing the artistic and technical content of rigweb system 210. Rigweb system frontend 410 may interact with rigweb system backend 420 to retrieve, edit, upload, or otherwise access content. In an embodiment, rigweb system frontend 410 can include any hardware and/or software elements that provide read-only access to the artistic and technical content of rigweb system 210. Rigweb system frontend 410 may be embodied as one or more of user computers 405 as discussed above. In another embodiment, rigweb system backend 420 can include any hardware and/or software elements that enable users of rigweb system frontend 410 to access content of rigweb system 210. Rigweb system backend 420 may be embodied as one or more of server computers 415 and/or databases 420 as discussed above. In an embodiment, rigweb system backend 420 can include any hardware and/or software elements that enable users to create, edit, or otherwise devolve content within rigweb system 210

In various embodiments, rigweb system frontend 410 may be coupled to multimedia presentation source 430 (e.g., via a communication link), capture sources 440, and to output devices 450. Source 430 may be used to incorporated multimedia presentation information into a body of knowledge maintained by rigweb system 210 for a standard rig. Source 430 can include a device which is capable of storing or providing access to multimedia presentation information stored in a particular format. For example, source 430 may be a laptop or other data processing device which stores the multimedia presentation information in the form of a multimedia presentation file, e.g. a POWERPOINT "*.ppt" file. Source 430 may also be a network which stores the multimedia presentation information or a device which provides access to the multimedia presentation information via the network. For example, source 430 may be coupled to a networked system and be capable of accessing the multimedia presentation information via a communication link. The multimedia presentation information may include textual information, image information, audio information, video information, other information, and/or combinations thereof.

Output devices 450 can provide a means for outputting portions of a body of knowledge maintained by rigweb system 210 for a standard rig. Some examples of output devices 440 are a video output device and audio output device. The video output device may be configured to output video and graphics information included in a body of knowledge maintained by rigweb system 210 for a standard rig. Examples of the video output device can include a screen, a monitor, a television, or other like devices. The audio output device may be configured to output audio information included in a body of knowledge maintained by rigweb system 210 for a standard rig. Examples of audio output device can include one or more speakers, and other like devices. It should be apparent that various configurations of output devices 440, having more or less components than those described, may be used in conjunction with rigweb system frontend 410. According to an embodiment, output devices 430 and rigweb system frontend 410 may be embodied in a single device. For example, a laptop computer may be configured to store or record multimedia presentation information for incorporating into a body of knowledge maintained by rigweb system 210 for a standard rig and to output a portion of a body of knowledge maintained by rigweb system 210 for a standard rig.

In some embodiments, rigweb system frontend 410 may be configured to include information captured or record during a multimedia presentation or other meeting. The information captured or recorded by rigweb system frontend 410 may include multimedia presentation information stored or accessed source 430 and information received from external sources during the presentation or meeting. In some embodiments, capture sources 440 may include devices for capturing information about a presenter, attendees of the presentation, and other sources. Examples of information received from capture devices 440 can include audio information from attendees of the presentation, audio narration of the person presenting the multimedia presentation, video information, or the like.

In an embodiment, rigweb system frontend 410 can process multimedia presentation information received from source 430 and information received from captured devices 450 and use rigweb system backend 420 to store the information in a format suitable for subsequent storage and retrieval. The stored format can include a representation of the information received from source 430 and from capture devices 450. The processing performed by rigweb system frontend 410 may include digitizing the audio and video information streams contained in the captured information, selecting keyframes from the video stream for storage, synchronizing the video information with the audio information, storing the synchronized video and audio information in a format suitable for later retrieval, applying speech recognition techniques to the audio sources, applying optical character recognition techniques to the video information, indexing the stored information to facilitate storage and retrieval, and several other functions. This processing may also be performed by rigweb system backend 420.

Figure 5:
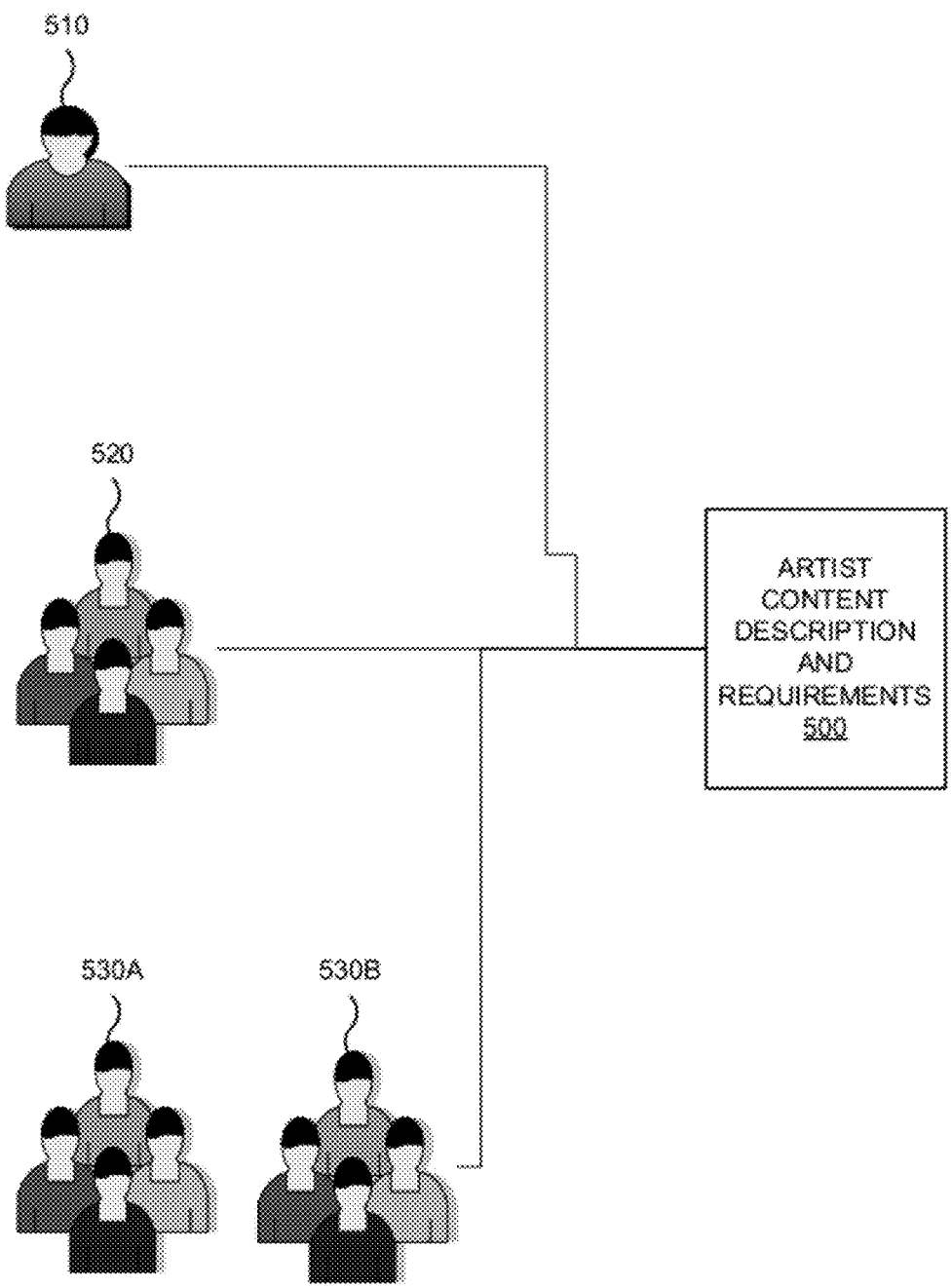
FIG. 5 is an illustration of potential sources of artistic content for a computer-generated character that may be incorporated in an embodiment.

FIG. 5 is an illustration of potential sources of artistic content for a computer-generated character that may be incorporated in an embodiment. In this example, artistic individual 510 or artistic group 520 may contribute personal or collective information using rigweb system 210 to a body of knowledge for the character. The information may be stored as artist content description and requirements 500. Artist content description and requirements 500 can include a description of the character and/or given portions of the character. Artist content description and requirements 500 can include requirements of how the entire character should look, how sections of the character should look, how the entire character should move, how given portions of the character should move, or the like.

In an embodiment, one or more animators in group 530A and one or more articulators in group 530B may collaborate to develop artist content description and requirements 500. For example, an animator may desire that the character move in a particular way but discover by collaborating with an articulator or other technical personnel that the specified motion is too technically complex or not actually required of the character. In various embodiments, the communication between individuals in artistic group 520, or between individuals in group 530A and group B, may be handled through rigweb system 210. In an embodiment, rigweb system 210 may enable users to schedule meetings. In another embodiment, rigweb system 210 may provide notifications to users of meetings or updates of artist content description and requirements 500.

Figure 6:
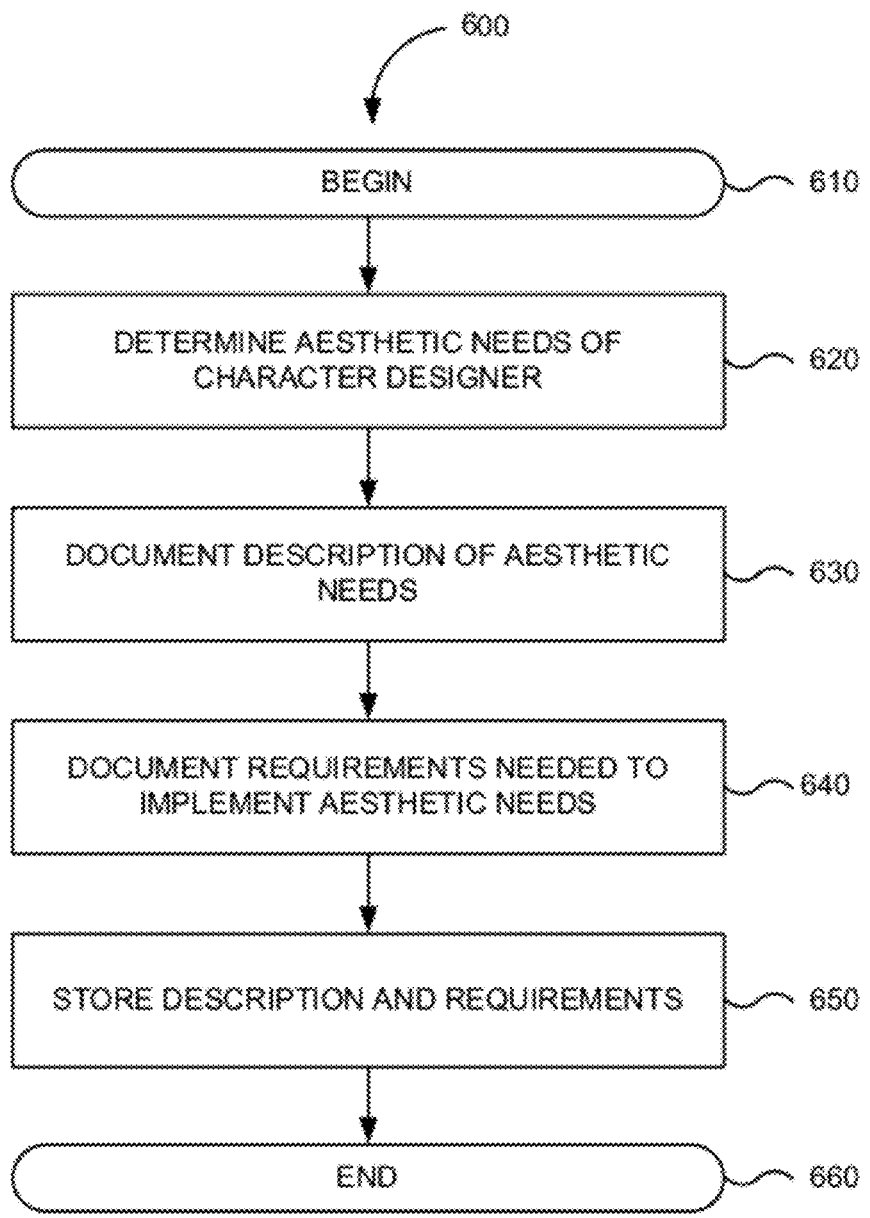
FIG. 6 is a simplified flowchart of a method for documenting the artistic description and requirements of a computer-generated character in an embodiment.

FIG. 6 is a simplified flowchart of method 600 for documenting the artistic description and requirements of a computer-generated character in an embodiment. Method 600 depicted in FIG. 6 begins in step 610. In step 620, any aesthetic needs of a character designer are determined. As discussed above, the aesthetic needs may include how a character is supposed to look, feel, move, act, or the like. The aesthetic needs may be provided by an individual or by collaboration between users. In an embodiment, aesthetic needs may be determined by having a series of meetings scheduled and monitored using rigweb system 210.

In step 630, a description of the aesthetic needs of the character designer are documented. For example, artistic individual 510 of FIG. 5 may provide a write-up or other documentation describing the character, environments, scenes or others settings in which the character may be placed, or the like. In step 640, one or more requirements needed to implement the aesthetic needs are documented. For example, artistic individual 510 of FIG. 5 may provide a write-up or other documentation describing how the character looks, feels, or acts generally or in specific situations.

In step 650, the description and requirements are stored. For example, rigweb system 210 may incorporate the description and requirements into a body of knowledge for the character. The information may be indexed for quick search, formatted, or processed to facilitate storage and subsequent retrieval. Method 600 ends in step 660.

Figure 7:
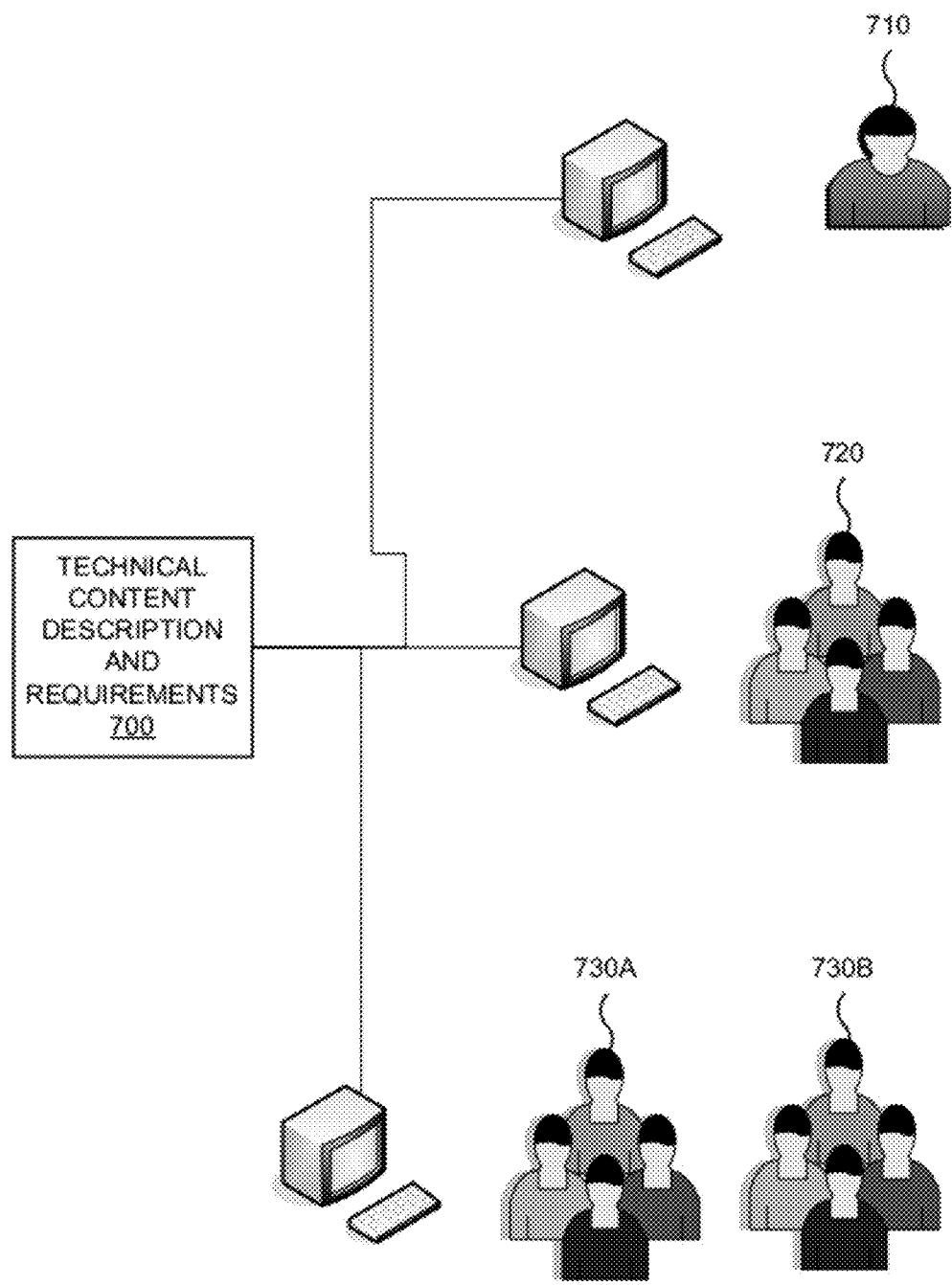
FIG. 7 is an illustration of potential sources of technical content for a computer-generated character that may be incorporated in an embodiment.

FIG. 7 is an illustration of potential sources of technical content for a computer-generated character that may be incorporated in an embodiment. In this example, technical individual 710 or technical group 720 may contribute personal or collective information using rigweb system 210 to a body of knowledge for the character. The information may be stored as technical content description and requirements 700. Technical content description and requirements 700 can include a technical description of the character and/or given portions of the character. Technical content description and requirements 700 can include requirements of how scripts, programming, rigging, or other animation variables provide how the entire character should look, how sections of the character should look, how the entire character should move, how given portions of the character should move, or the like. In an embodiment, one or more animators in group 730A and one or more articulators in group 730B may collaborate to develop technical content description and requirements 700. For example, an articulator may develop a set of controls for animating the character and by collaborating with an articulator or other artistic personnel can fine tune the development to suite needs or preferences of artistic or other non-technical personnel.

Figure 8:
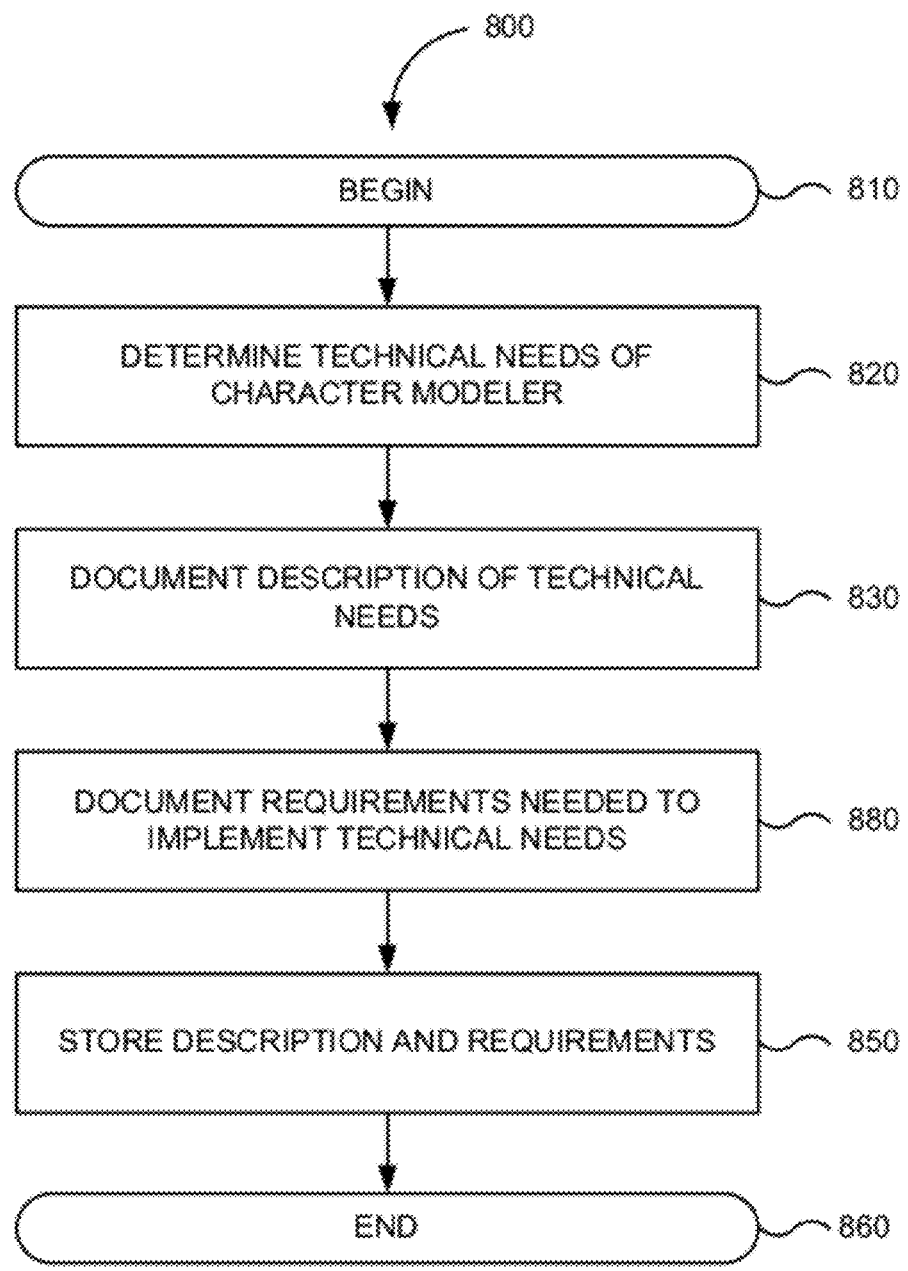
FIG. 8 is a simplified flowchart of a method for documenting the technical description and requirements of a computer-generated character in an embodiment.

FIG. 8 is a simplified flowchart of method 800 for documenting the technical description and requirements of a computer-generated character in an embodiment. Method 800 depicted in FIG. 8 begins in step 810. In step 820, any technical needs of a character modeler are determined. As discussed above, the technical needs may include information that provides how a character is supposed to look, feel, move, act, or the like. In an embodiment, the technical needs may include a surface representation that can be used to draw a character (e.g., the skin) and a hierarchical set of controls or animation variables used for animation (e.g., the skeleton or rigging). A control may provide a three dimensional transformation (which can include the position, scale, and orientation of a portion of the character) and be linked to an optional parent control. The controls therefore may form a hierarchy. In an embodiment, a full transform of a child control may include the product of its parent transform and its own transform.

In step 830, a description of the technical needs of the character modeler are documented. For example, technical individual 710 of FIG. 7 may provide a write-up or other documentation identifying and describing each control in the hierarchy of controls for the character. In step 840, one or more requirements needed to implement the technical needs are documented. For example, technical individual 710 of FIG. 7 may provide a write-up or other documentation describing how to implement the function of each control in general or in specific situations.

In step 850, the description and requirements are stored. For example, rigweb system 210 may incorporate the description and requirements into a body of knowledge for the character. The information may be indexed for quick search, formatted, or processed to facilitate storage and subsequent retrieval. Method 800 ends in step 860.

Figure 9:
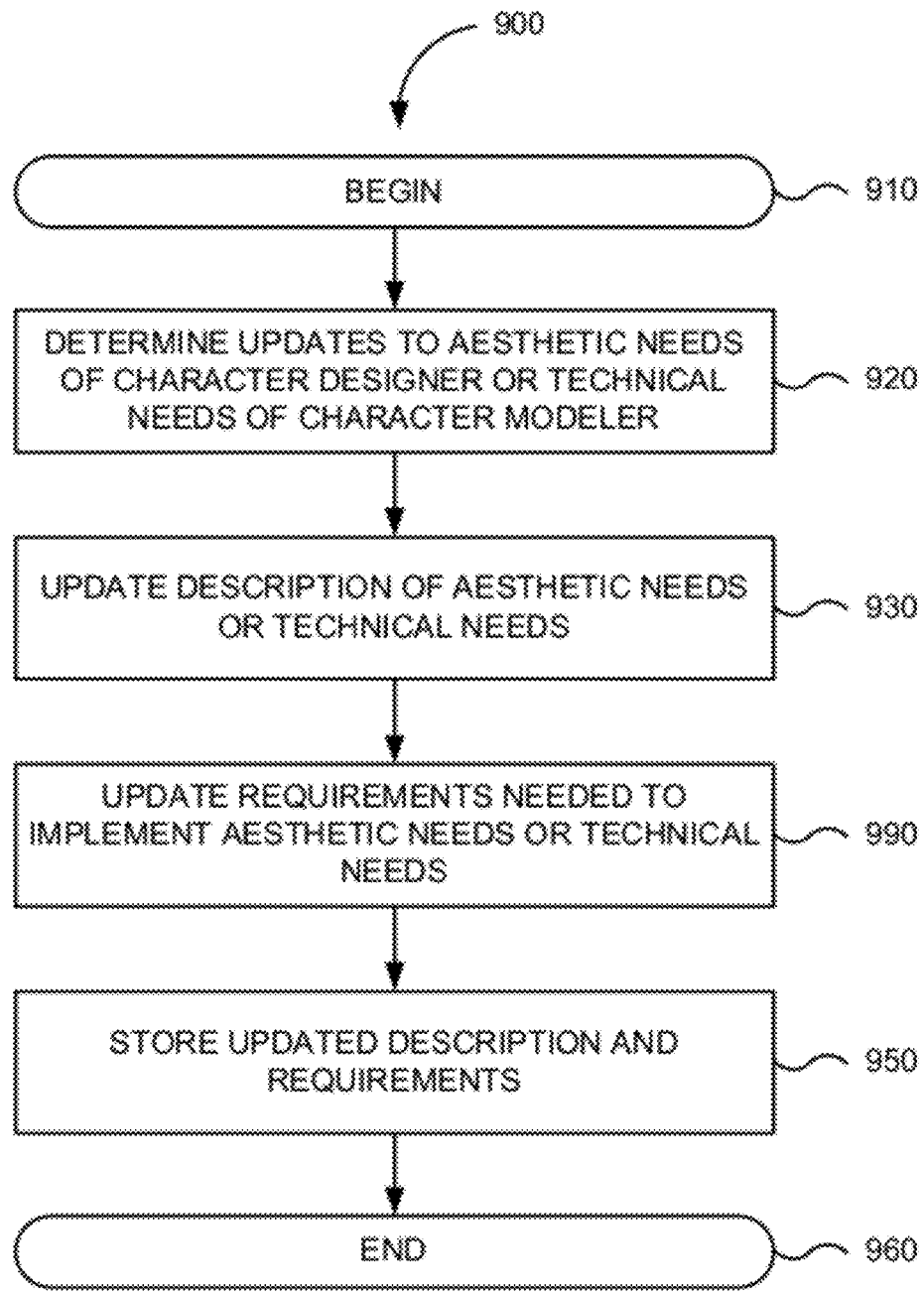
FIG. 9 is a simplified flowchart of a method for updating the artistic or technical description and requirements of a computer-generated character in an embodiment.

FIG. 9 is a simplified flowchart of method 900 for updating the artistic or technical description and requirements of a computer-generated character in an embodiment. Method 900 depicted in FIG. 9 begins in step 910. In step 920, updates to the aesthetic needs of the character designer or the technical needs of the character modeler are determined. The determination may occur during one or more collaborations, meetings, reviews, or the like.

In step 930, a description of the artistic needs or the technical needs are updated. For example, a write-up or other documentation may be provided with the updates. In another example, artistic content or technical content within the body of knowledge maintained by rigweb system 210 may be annotated with the updates. In step 940, one or more requirements needed to implement the aesthetic or technical needs are updated. In step 950, the updated description and requirements are stored. For example, rigweb system 210 may incorporate the updated description and requirements into the body of knowledge for the character. The updated information may be indexed for quick search, formatted, or processed to facilitate storage and subsequent retrieval. Method 900 ends in step 960.

Figure 10:
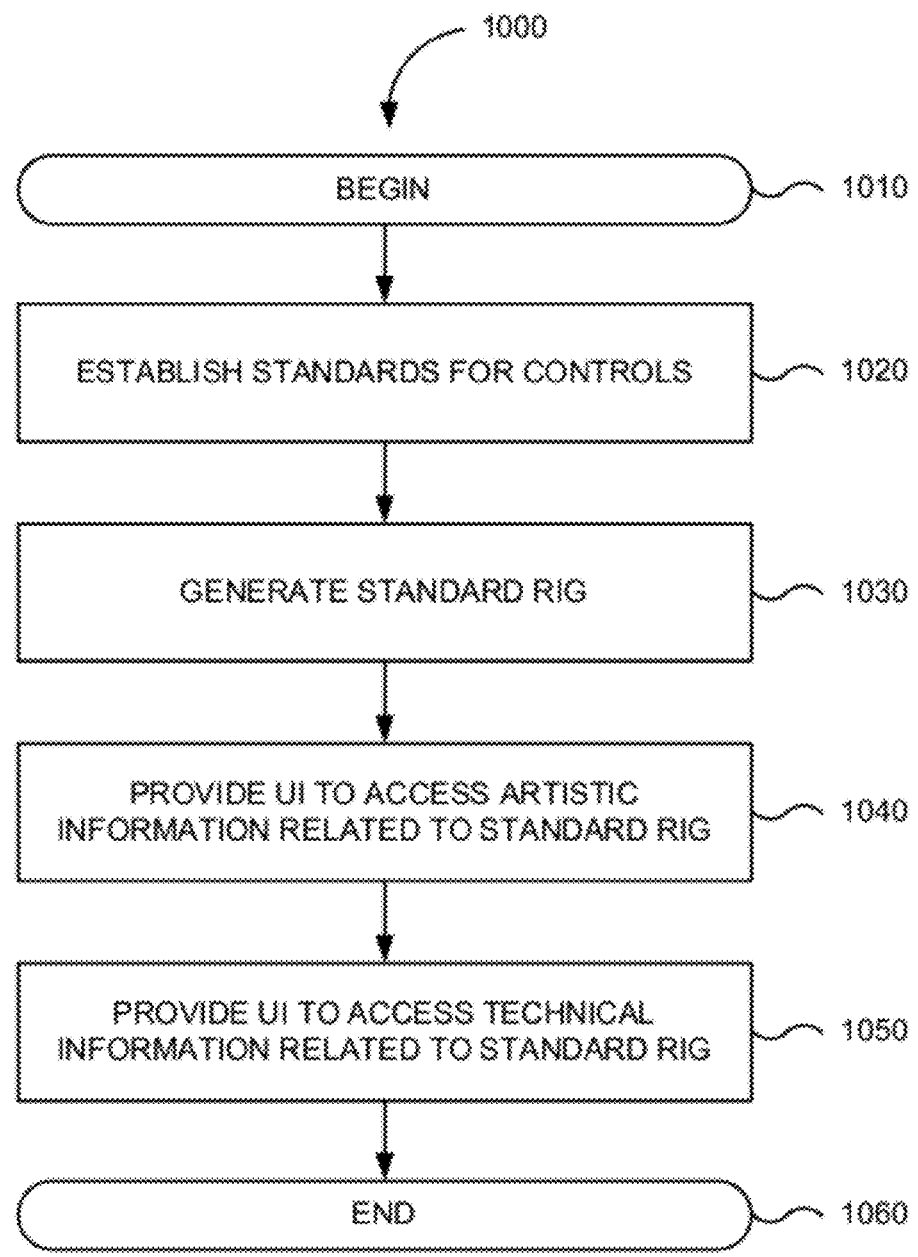
FIG. 10 is a flowchart of a method for accessing a body of knowledge for a standard rig in an embodiment.

FIG. 10 is a flowchart of method 1000 for accessing a body of knowledge for a standard rig in an embodiment. In an embodiment, an animation rig may be designated within rigweb system 210 as a standard, much like a template. Method 1000 depicted in FIG. 10 begins in step 1010. In step 1020, standards for one or more controls associated with a computer-generated object are established. The standards may include naming conventions for the controls, position within a hierarchy for each control, limits on the number of controls, which functionality is provided by which controls, or the like.

In step 1030, a standard rig is generated. The standard rig or rigging may include a basic set of controls to implement the established standards. Information defining the set of controls and any associated hierarchy may be imported from a tool used to develop animation rigging. For example, rigweb 210 may incorporate a parser that is configured to read control information export from an animation tool and output the control information to generate the standard rig.

In step 1040, a graphical user interface is provided to access artistic information or content related to the standard rig. For example, standardized rigging may be developed for a bipedal character. A user may interact with the artistic information related to rigging for the bipedal character to understand how a bipedal character generally looks and feels. Thus, the user does not have to reinvent a bipedal character, but can incorporate the artistic information when developing new characters and spend more creative energy focusing one how to develop the persona of the new character.

In step 1050, a graphical user interface is provided to access technical information or content related to the standard rig. For example, standardized rigging may be developed for a quadruped character. A user may interact with the technical information related to rigging for the quadruped character to understand the controls associated with a quadruped character in general. Thus, the user does not have to reinvent a quadruped character, but can incorporate the technical information when developing new characters and spend more creative energy focusing one how to implement or adapt the controls for the new character. Method 10 ends in step 1060.

Figure 11:
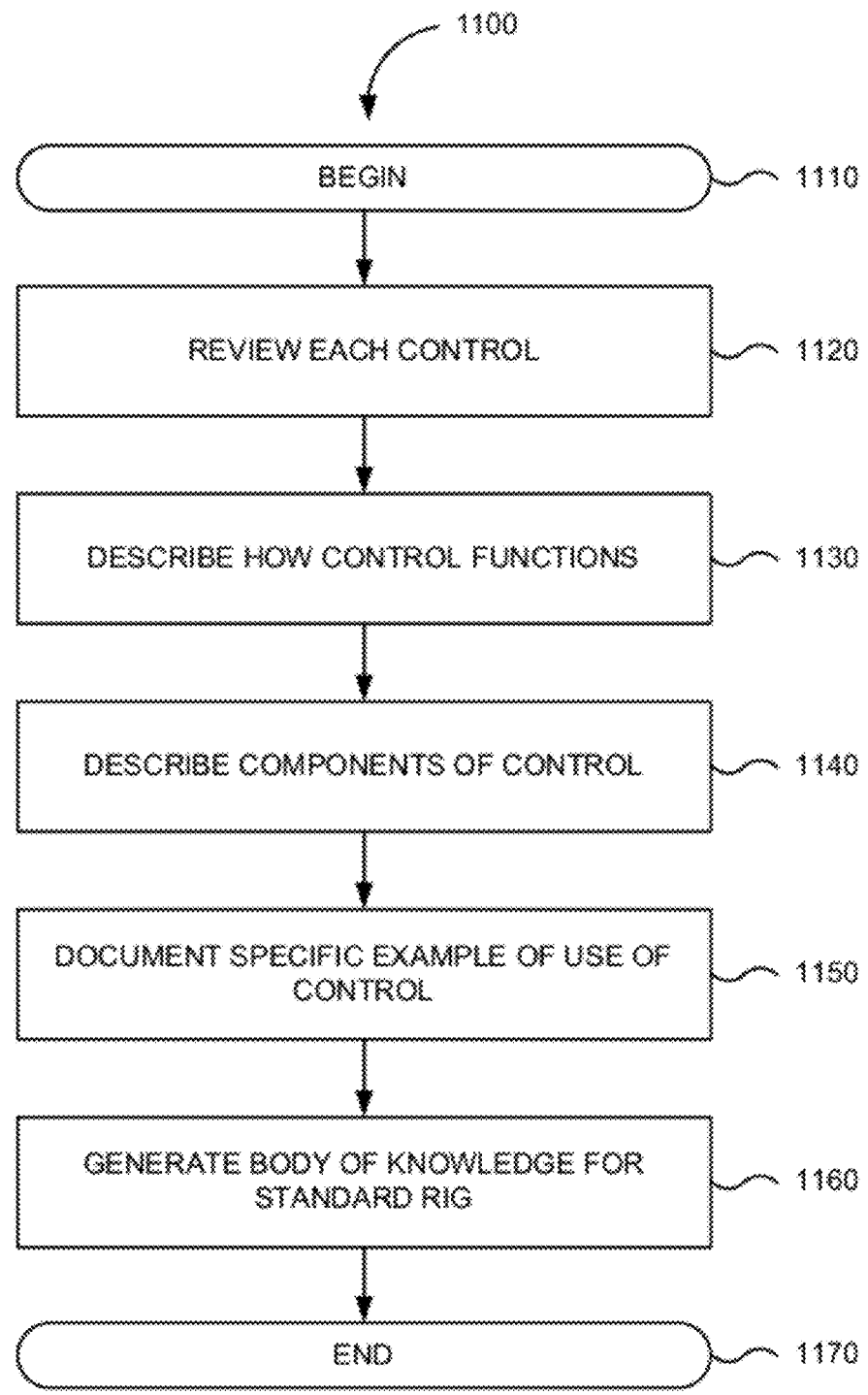
FIG. 11 is a flowchart of a method for creating a standard rig in an embodiment.

FIG. 11 is a flowchart of method 1100 for creating a standard rig in an embodiment. Method 1100 depicted in FIG. 11 begins in step 1110. In general, software systems or packages that enable manipulation of an object in a virtual 2-D or 3-D space generally provide a set of controls that enable a user of the package to carry out the manipulations. For example, most animation software packages provide a set of controls that allow the user to directly transform (e.g., change position, scale, change orientation) computer generated image (CGI) models in virtual 3-D space. Each control may include one or more "manipulators" that allow the user to control model transformation. A user can "grab" a manipulator of a control using a computer cursor and move the manipulator in a desired direction to affect the desired transform or manipulation of the model.

In step 1120, each control of the standard rig in reviewed. For example, one or more animators and articulators may collaborate by interacting with the graphical user interfaces provided by rigweb system 210 as discussed in FIG. 10. In step 1130, how each control functions is described. Conventionally, controls and their manipulators may be drawn in a way that indicates what transformations can be achieved by a user by using the controls. Designers of some controls generally rely on a fixed "language" of shape and color to indicate the range of use of each control to the user. Standard control designs can be well-understood by some users, but less well-known by others.

In complex models, multiple controls may need to be displayed concurrently to control an object and control point. In such situations, the minimum screen area necessary to draw the standard widgets at a reasonable size can generally be greater than the space between the control points or objects. As a result, these controls may tend to overlap and/or occlude each other, leading to control confusion on part of the user, and eventually resulting in inoperability of the controls to a new or less experiences user. Therefore, a description may be provided where a control is located, how a given control is manipulated by a user, and the resulting manipulations to a computer-generated object.

In step 1140, components of each control are described. In some embodiment, a given control may include multiple manipulators offering various degrees of transformation. In one example, each manipulator may be represented as a "steering wheel" style half-ring allowing a user to grab a manipulator and move it along the ring in the desired direction to achieve a desired transformation. A description may be provide for each of the manipulators.

In step 1150, a specific example of use of each control is provided. The specific example of use may include a video, an audio recording, a set of one or more images, or the like. In some embodiments, the example of use may be annotated (e.g., using virtual ink).

In step 1160, the body of knowledge for the standard rig is generated. The body of knowledge can include the name of each control, the position of each control in a hierarchy, the description of how each control functions, the description of the components of each control, and any specific examples of use of each control. Method 1100 ends in step 1170.

Figure 12:
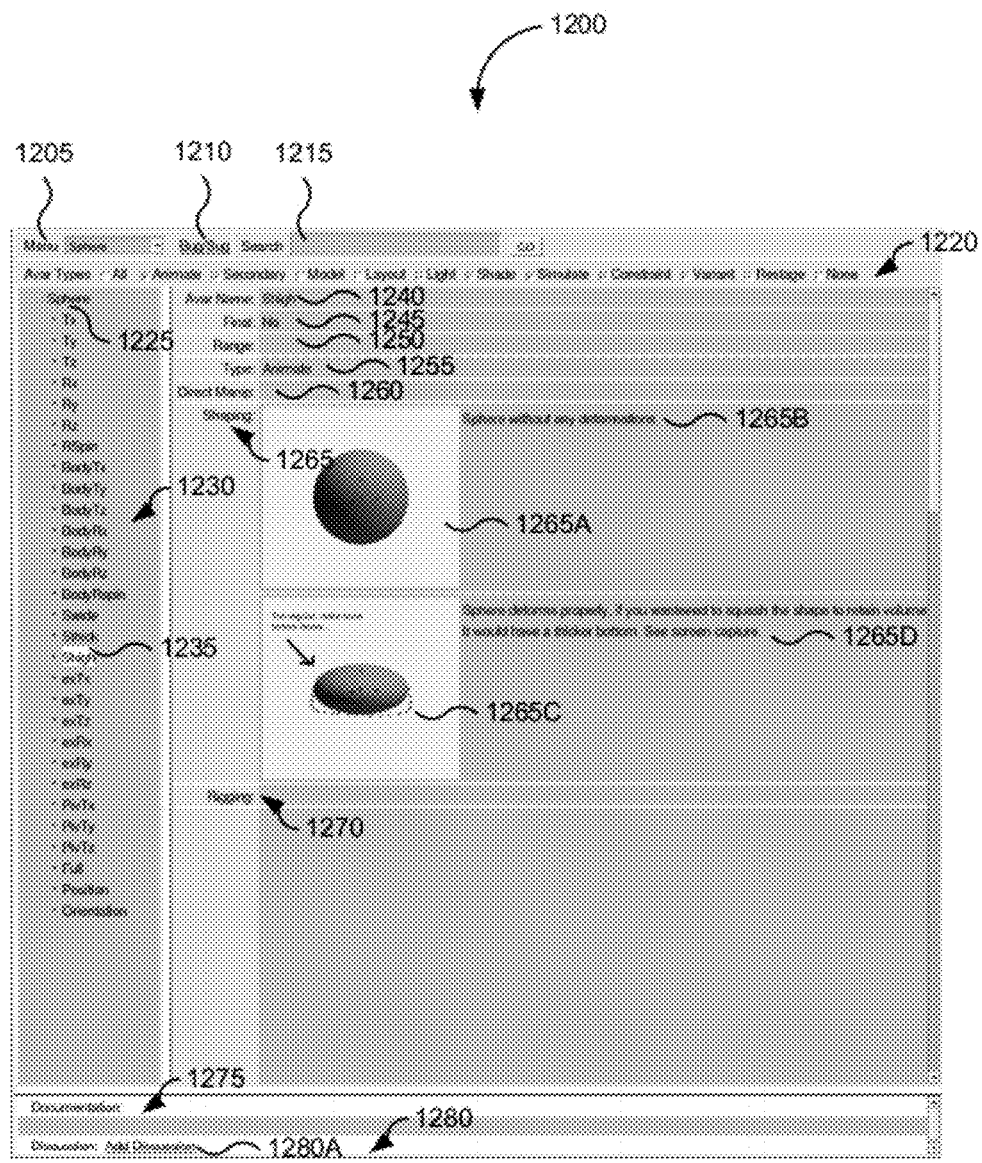
FIG. 12 is a screenshot of one embodiment of a front-end graphical user interface for accessing a body of knowledge for a standard rig using the rigweb system of FIG. 2.

FIG. 12 is a screenshot of one embodiment of front-end graphical user interface (GUI) 1200 for accessing a body of knowledge for a standard rig using rigweb system 210 of FIG. 2. In this example, GUI 1200 includes a menu bar with rigging selection feature 1205, bug/suggestion reporting feature 1210, search bar 1215, and avar type selection bar 1220. GUI 1200 may provide other user interface elements and controls that enable access to the body of knowledge maintained by rigweb system 210 for the standard rig.

In a left frame or panel, GUI 1200 may provide quick access to information for "Sphere" rig 1225 that includes one or more controls in hierarchy 1230 of controls. A control, such as "Shigh" control 1235 may be selected by a user within the left frame. The name of control 1235 may be highlighted or visually enhanced within hierarchy 1230 to indicated selection of control 1235. In a right frame or panel, GUI 1200 may outline or otherwise delineate areas of information within the body of knowledge for rig 1225 generally or for control 1235 when selected by a user. The right frame may include areas of information, such as avar information 1240, final information 1245, range information 1250, type information 1255, direct manipulation information 1260, shaping information 1265, and rigging information 1270. GUI 1200 may also include other frames or panels in different layouts and arrangements. In an embodiment, GUI 1200 can include documentation area 1275 and discussion area 1280.

Rigging selection feature 1206 can include one or more GUI elements that provide access to rigging maintained by rigweb system 210, such as "Sphere" rig 1225. A user may interact with rigging selection feature 1205 to select rigging maintained by rigweb system 210, such as a "Sphere," from a drop down list in one embodiment. Bug/suggestion reporting feature 1210 can include one or more GUI elements that provide access to interfaces for reporting bugs or providing suggestions. A user may submit a bug for a specific control or provide suggestions relevant to rigging or controls in general. Search bar 1215 can include one or more GUI elements that enable a user to enter search terms or other search criteria to initiate and obtain search results from information within the body of knowledge maintained by rigweb system 210. Various search interfaces, such as natural language and keyword search, and searching techniques may be incorporated by rigweb system 210 to facilitate searching using search bar 1215.

In one embodiment, avar type selection bar 1220 can include one or more GUI elements that provide one or more options that enable a user of rigweb system 210 to select which controls or animation variables (avars) should be displayed. Avar type selection bar 1220 can include one or more GUI elements that enable to user to choose all or part of a set of controls, such as those controls associated with animation avars, secondary avars, model avars, layout avars, light avars, shade avars, simulate avars, constraint avars, variant avars, restage avars, or the like. Information relevant to selections made using avar type selection bar 1240 can be displayed in each and any of the various panels provided by GUI 1200.

In one example, "Shigh" control 1235 has been selected by a user within the left frame. The name of control 1235 can be highlighted or visually enhanced to indicated selection of the control. In the right frame or panel, GUI 1200 displays information within the body of knowledge for control 1235 selected by a user. GUI 1200 can display the relationship between controls in hierarchy 1230 of controls. In some embodiments, hierarchy 1230 can visually illustrate how each control is related and any dependencies thereon. In an embodiment, the manner in which a user interacts with controls in hierarchy 1230 may mimic or be substantially similar to operation or functionality of a design tool or animation tool used by animators or articulators.

In various embodiments, artistic content and technical content maintained by rigweb system 210 for control 1235 may be displayed to a user in the right panel. Avar information 1240 can include information about control 1235, such as its name. Final information 1245 can include information about the status or scope of control 1235. Range information 1250 can include value ranges or data types associated with control 1235, such as Boolean or string. Type information 1255 can include information about whether control 1235 is associated with or designated as an animation avar, secondary avar, model avar, layout avar, light avar, shade avar, simulate avar, constraint avar, variant avar, restage avar, or the like.

Direct manipulation information 1260 can include information about whether control 1235 can be directly manipulated by a user and content describing how such manipulation can take place. Shaping information 1265 can include information about how control 1235 manipulates the shape of rig 1225. Shaping information 1265 may include textual information, images, audio information, video information, and other multimedia information. In one example, shaping information 1265 includes image 1265A illustrating rig 1225 without any deformations caused by manipulations of control 1235. Textual content 1265B can be provided describing image 1265A. In another example, shaping information 1265 includes image 1265C illustrating rig 1225 with deformations caused by manipulations of control 1235. Textual content 1265D can be provided describing image 1265A. Rigging information 1270 can include rigging information about control 1225.

GUI 1200 may also include other frames or panels in different layouts and arrangements. In an embodiment, documentation area 1275 can provide access to documents, such text documents, images, audio files, video files, presentation files, and other multimedia documents. In on example, hyperlinks may be provided to documents maintained by rigweb system 210. In another example, links to a document management system may be incorporated into documentation area 1275. In an embodiment, discussion area 1280 can provide access to discussions maintained by rigweb system 210. Discussion area 1280 may include meeting minutes, notes, e-mails, instant messages, message threads, forum discussions, or the like.

Figure 13:
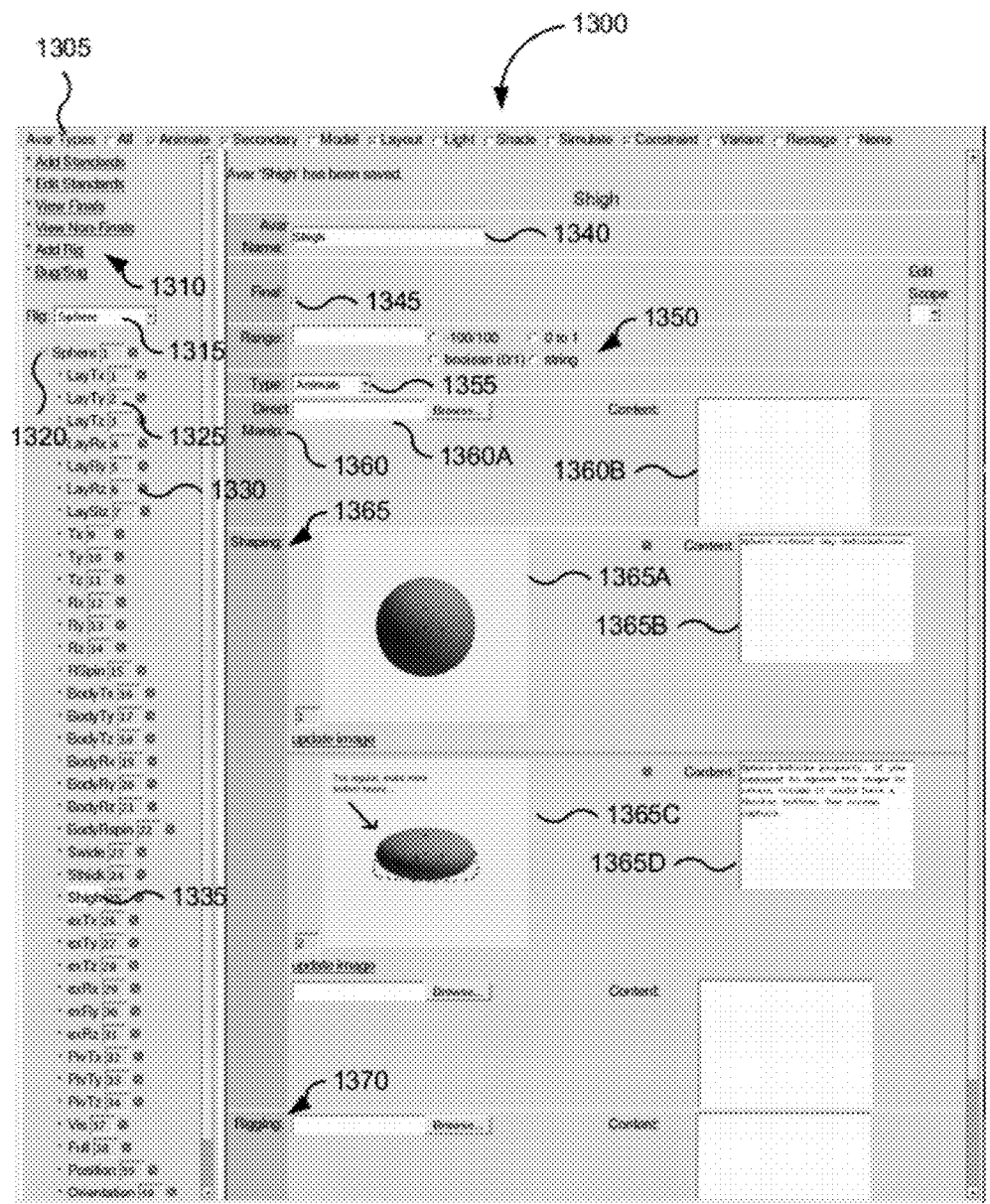
FIG. 13 is a screenshot of one embodiment of a back-end graphical user interface for creating or modifying a body of knowledge for a standard rig using the rigweb system of FIG. 2.

FIG. 13 is a screenshot of one embodiment of back-end graphical user interface (GUI) 1300 for creating or modifying a body of knowledge for a standard rig using rigweb system 210 of FIG. 2. In this example, GUI 1300 can include GUI 1200 includes a menu bar avar type selection bar 1305. GUI 1300 can provide GUI elements that enable a user to create, import, edit, or otherwise modify the body of knowledge maintained by rigweb system 210 for the standard rig.

In a left frame or panel, GUI 1300 can include on or more GUI elements, such as links 1310 for adding standards, editing standards, viewing finals, viewing non-finals, adding rigging, or accessing bug/suggestion reporting features. GUI 13100 may provide quick access to information for rigging maintained by rigweb system 210 from drop down list 1315. "Sphere" rig 1320 may be selected by a user for editing. Rig 1320 may include one or more controls in a hierarchy of controls. Using GUI element 1325, a user can edit the placement of a control in the hierarchy. For example, a user can provide a value representing an index for the control within the hierarchy. Using GUI element 1330, a user can delete a control from the hierarchy. One or more other GUI elements may be incorporated to facilitate addition, deletion, or arrangement of controls within the hierarchy.

In this example, "Shigh" control 1335 has been selected by a user within a left frame or panel of GUI 1300 for editing. The name of control 1335 may be highlighted or visually enhanced within the hierarchy to indicated selection of control 1335. In a right frame or panel, GUI 1300 may provide sections for delineating areas of information within the body of knowledge for rig 1325 generally or for control 1335 when selected by a user. The right frame may include areas of information, such as avar section 1340, final section 1345, range section 1350, type section 1355, direct manipulation section 1360, shaping section 1365, and rigging section 1370. GUI 1300 may also include other frames or panels in different layouts and arrangements. In an embodiment, GUI 1300 can include one or more GUI elements that enable a user to upload documentation and discussions to rigweb system 210 or otherwise incorporate documentation and discussions into the body of knowledge for rig 1320.

In various embodiments, artistic content and technical content can be incorporated into a body of knowledge maintained by rigweb system 210 for control 1335. Avar section 1340 can include one or more GUI elements that enable a user to supply information about control 1235, such as its name. Final section 1345 can include one or more GUI elements that enable a user to supply information about the status or scope of control 1235. Range section 1350 can include can include one or more GUI elements that enable a user to supply value ranges [e.g., 0 to 1 and −100 to 100] or data types associated with control 1335, such as Boolean or string. Type section 1355 can include one or more GUI elements that enable a user to supply information about whether control 1235 is associated with or designated as an animation avar, secondary avar, model avar, layout avar, light avar, shade avar, simulate avar, constraint avar, variant avar, restage avar, or the like.

Direct manipulation section 1360 can include one or more GUI elements that enable a user to supply information about whether control 1235 can be directly manipulated by a user and content describing how such manipulation can take place. Shaping section 1365 can include one or more GUI elements that enable a user to supply information about how control 1335 manipulates the shape of rig 1325. The user may supply textual information, images, audio information, video information, and other multimedia information to describe the artistic needs or technical needs of a shape. GUI elements may be included for providing an ordering or information within shaping section 1365, uploading images, entering text, deleting information, or the like. In one example, shaping section 1365 includes image 1365A illustrating rig 1325 without any deformations caused by manipulations of control 1335. Text box 1365B can be used to enter text describing image 1365A. In another example, shaping section 1365 includes image 1365C illustrating rig 1325 with deformations caused by manipulations of control 1335. Text box 1365D can be used to enter text describing image 1365A. Rigging section 1270 can include one or more GUI elements that enable a user to supply rigging information about control 1225.

In various embodiments, documentation may be uploaded to rigweb system 210 and associated with the body of knowledge for the standard rig. The documentation may include may include a description and requirements of the aesthetic or artistic needs of character designer. In another example, the documentation may include a description and requirements of the technical needs of a character modeler. The documentation may include textual information, images, audio information, video information, and other multimedia information.

In some embodiments, electronic messages may be uploaded to rigweb system 210 and associated with the body of knowledge for the standard rig. The electronic messages may include e-mail messages or instant messages relevant to a give control or to the standard rig in general. The electronic messages may be organized by thread, topic, sender, recipient, ranking, or the like. Some electronic messages may include attachments or other associated documents.

Figure 14:
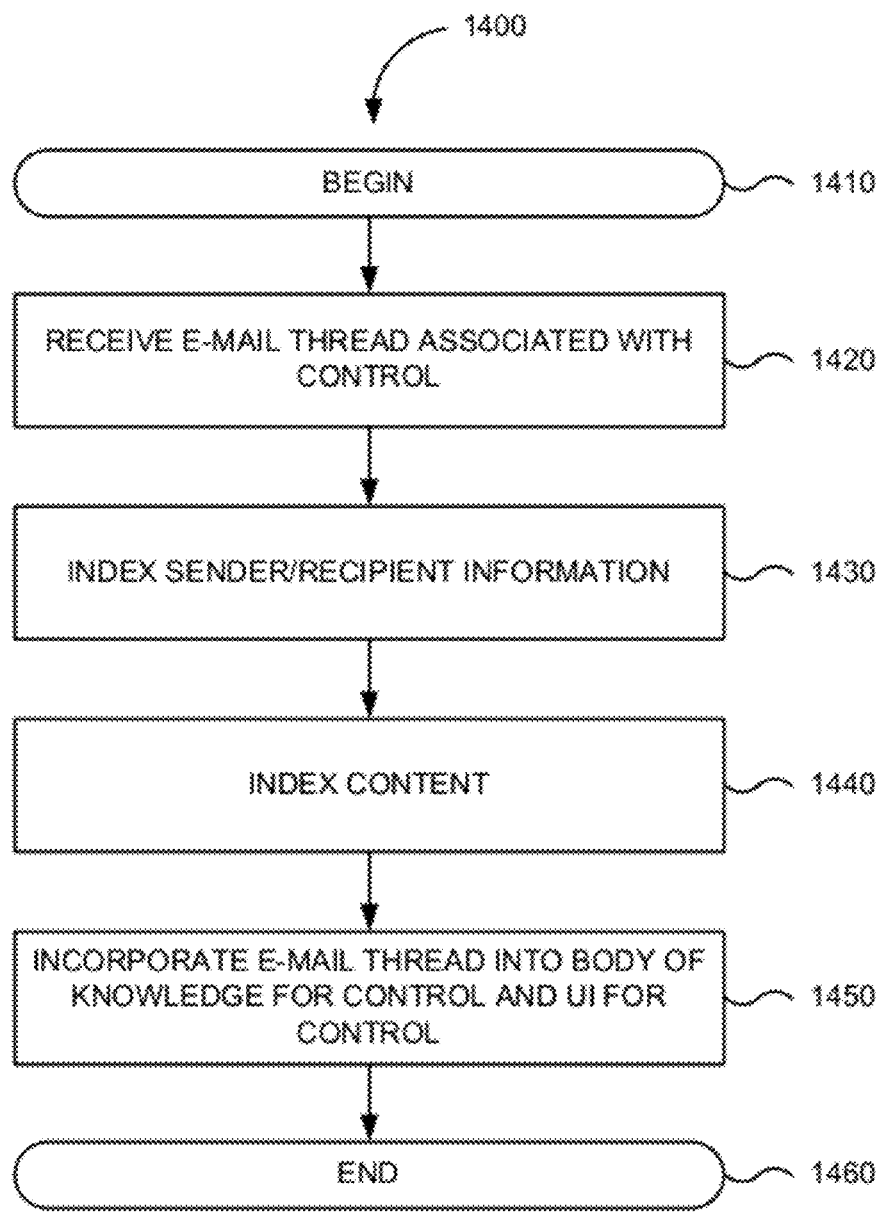
FIG. 14 is a flowchart of a method for incorporating electronic messages into a body of knowledge for a standard rig in an embodiment.

FIG. 14 is a flowchart of method 1400 for incorporating electronic messages into a body of knowledge for a standard rig in an embodiment. Method 1400 depicted in FIG. 14 begins in step 1410. In step 1420, an e-mail thread associated with a control is received. For example, a set of e-mail messages representing a conversation may be uploaded to or otherwise received using rigweb system 210. In another embodiment, messaging and collaboration features may be integrated into GUI 1200 and GUI 1300 such that electronic messaging is handled by rigweb system 210.

In step 1430, sender/recipient information is indexed. In one example, rigweb system 210 may index the e-mail thread to provide an audit trail. The audit trail can enable subsequent users to determine who created content, made changes to content, or was otherwise associated with documentation or messages within the body of knowledge for a standard rig.

In step 1440, content is indexed. For example, the body of e-mail messages in the e-mail thread may be index by keyword, topic, or the like. In step 1450, the e-mail thread is incorporated into the body of knowledge for the standard rig, such as for the UI of a given control as shown in FIG. 13. Method 1400 ends in step 1460.

Figure 15:
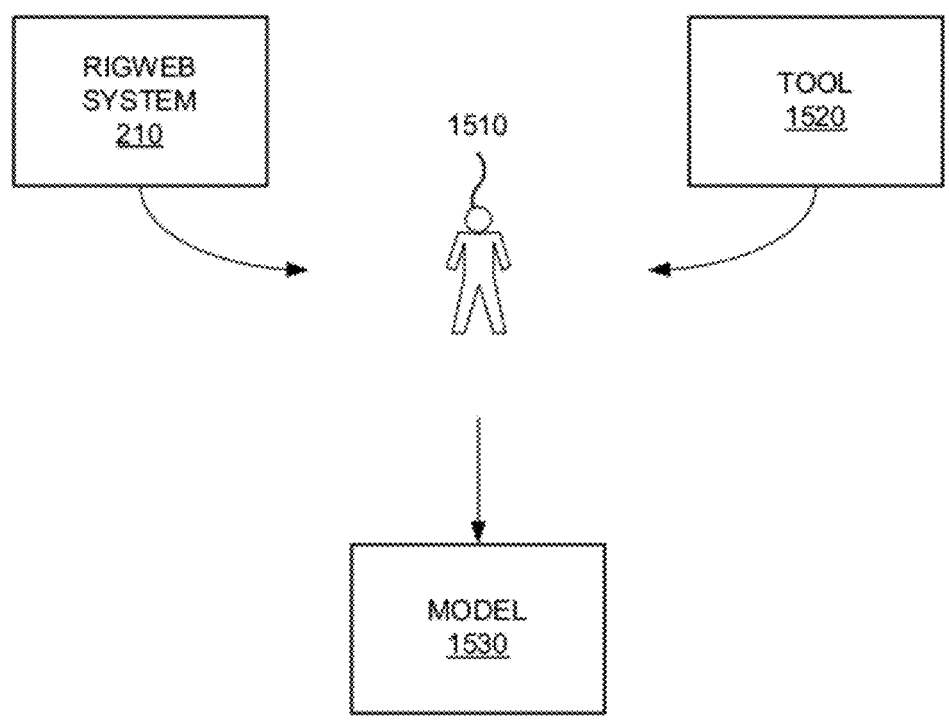
FIG. 15 is an illustration of using the rigweb system to create a computer-generated model in an embodiment.

FIG. 15 is an illustration of using rigweb system 210 to create a computer-generated model in an embodiment. In this example, user 1510 can access rigweb system 210 and use tool 1520 to create model 1530. User 1510 may perform one or more searches using rigweb system 210 for a standard rig. In another example, user 1510 may receive an electronic message with a hyperlink to the standard rig that should be used to create model 1530 using tool 1520.

In an embodiment, user 1510 may obtain information about how each control in a set of controls works as described within a body of knowledge for a desired standard rig. User 1510 may obtain information about the artistic or aesthetic needs of animators when developing model 1530 that will make the work of the animators easier. User 1510 may receive documents, tutorials, annotations, presentation, or the like, found within the body of knowledge for the standard rig. In various embodiments, user 1510 may interact with a set of controls described within the body of knowledge for a desired standard rig in much the same manner as using tool 1520.

Figure 16:
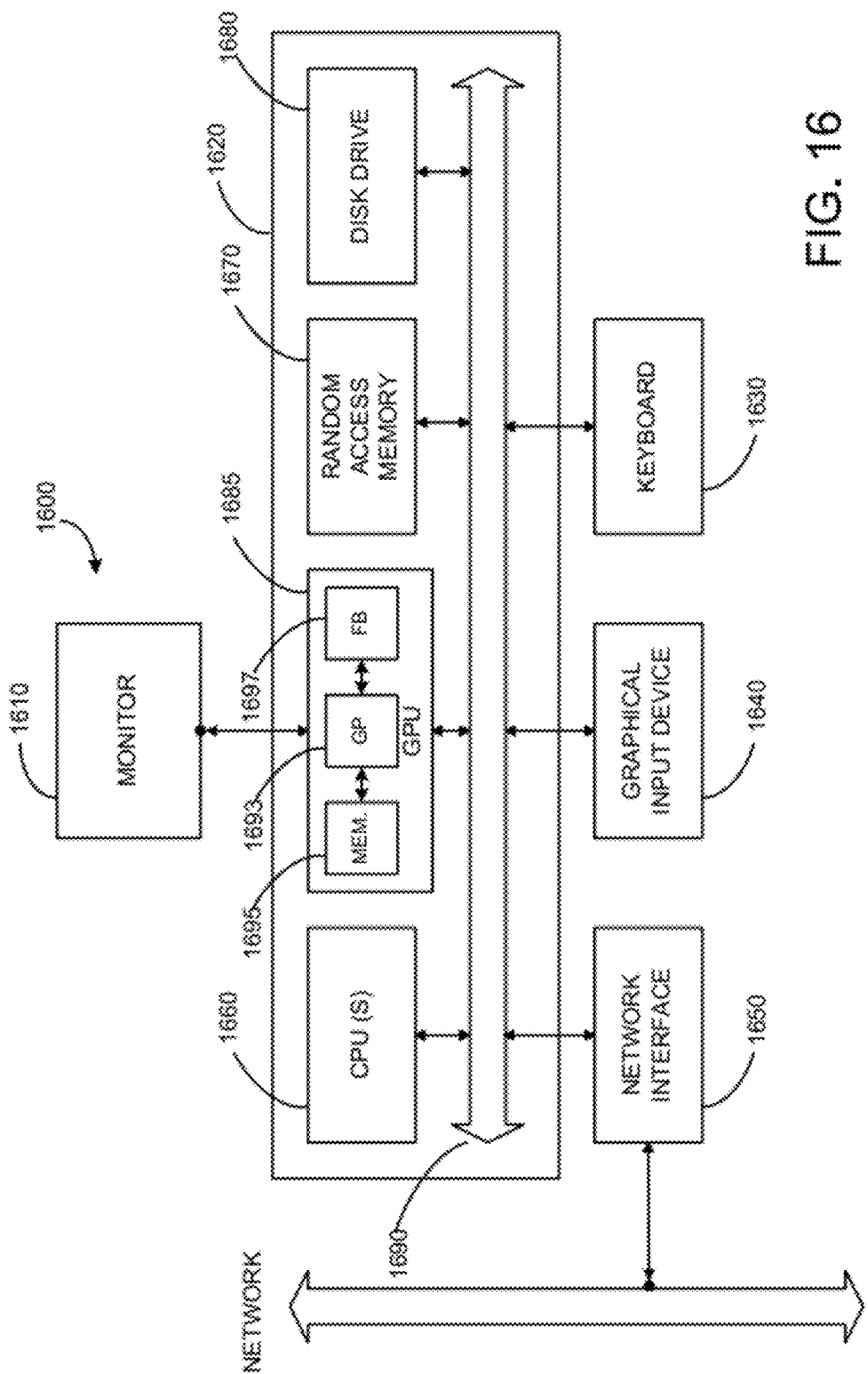
FIG. 16 is a block diagram of a computer system or information processing device that may be used to implement or practice various embodiments whose teachings may be presented herein.

FIG. 16 is a block diagram of computer system 1600 that may be used to implement or practice various embodiments of an invention whose teachings may be presented herein. FIG. 16 is merely illustrative of a general-purpose computer system or specific information processing device for an embodiment incorporating an invention whose teachings may be presented herein and does not limit the scope of the invention as recited in the claims. One of ordinary skill in the art would recognize other variations, modifications, and alternatives.

In one embodiment, computer system 1600 can include monitor 1610, computer 1620, keyboard 1630, user input device 1640, computer interfaces 1650, or the like. Monitor 1610 may typically include familiar display devices, such as a television monitor, a cathode ray tube (CRT), a liquid crystal display (LCD), or the like. Monitor 1610 may provide an interface to user input device 1640, such as incorporating touch screen technologies.

Computer 1620 may typically include familiar computer components, such as processor 1660 and one or more memories or storage devices, such as random access memory (RAM) 1670, one or more disk drives 1680, graphics processing unit (GPU) 1685, or the like. Computer 1620 may include system bus 1690 interconnecting the above components and providing functionality, such as inter-device communication.

In further embodiments, computer 1620 may include one or more microprocessors (e.g., single core and multi-core) or micro-controllers, such as PENTIUM, ITANIUM, or CORE 4 processors from Intel of Santa Clara, Calif. and ATHLON, ATHLON XP, and OPTERON processors from Advanced Micro Devices of Sunnyvale, Calif. Further, computer 1620 may include one or more hypervisors or operating systems, such as WINDOWS, WINDOWS NT, WINDOWS XP, VISTA, or the like from Microsoft or Redmond, Wash., SOLARIS from Sun Microsystems, LINUX, UNIX, and UNIX-based operating system.

In various embodiments, user input device 1640 may typically be embodied as a computer mouse, a trackball, a track pad, a joystick, a wireless remote, a drawing tablet, a voice command system, an eye tracking system, or the like. User input device 1640 may allow a user of computer system 1600 to select objects, icons, text, user interface widgets, or other user interface elements that appear on monitor 1610 via a command, such as a click of a button or the like.

In some embodiments, computer interfaces 1650 may typically include a communications interface, an Ethernet card, a modem (telephone, satellite, cable, ISDN), (asynchronous) digital subscriber line (DSL) unit, FireWire interface, USB interface, or the like. For example, computer interfaces 1650 may be coupled to a computer network, to a FireWire bus, a USB hub, or the like. In other embodiments, computer interfaces 1650 may be physically integrated as hardware on the motherboard of computer 1620, may be implemented as a software program, such as soft DSL or the like, or may be implemented as a combination thereof.

In various embodiments, computer system 1600 may also include software that enables communications over a network, such as the Internet, using one or more communications protocols, such as the HTTP, TCP/IP, RTP/RTSP protocols, or the like. In some embodiments, other communications software and/or transfer protocols may also be used, for example IPX, UDP or the like, for communicating with hosts over the network or with a device directly connected to computer system 1600.

RAM 1670 and disk drive 1680 are examples of machine-readable articles or computer-readable media configured to store information, such as computer programs, executable computer code, human-readable source code, shader code, rendering enginges, or the like, and data, such as image files, models including geometrical descriptions of objects, ordered geometric descriptions of objects, procedural descriptions of models, scene descriptor files, or the like. Other types of computer-readable storage media or tangible machine-accessible media include floppy disks, removable hard disks, optical storage media such as CD-ROMS, DVDs and bar codes, semiconductor memories such as flash memories, read-only-memories (ROMS), battery-backed volatile memories, networked storage devices, or the like.

In some embodiments, GPU 1685 may include any conventional graphics processing unit. GPU 1685 may include one or more vector or parallel processing units that may be user programmable. Such GPUs may be commercially available from NVIDIA, ATI, and other vendors. In this example, GPU 1685 can include one or more graphics processors 1693, a number of memories and/or registers 1695, and a number of frame buffers 1697.

As suggested, FIG. 16 is merely representative of a general-purpose computer system or specific data processing device capable of implementing or incorporating various embodiments of an invention presented within this disclosure. Many other hardware and/or software configurations may be apparent to the skilled artisan which are suitable for use in implementing an invention presented within this disclosure or with various embodiments of an invention presented within this disclosure. For example, a computer system or data processing device may include desktop, portable, rack-mounted, or tablet configurations. Additionally, a computer system or information processing device may include a series of networked computers or clusters/grids of parallel processing devices. In still other embodiments, a computer system or information processing device may techniques described above as implemented upon a chip or an auxiliary processing board.

What is claimed is:

1. A method for creating rigging associated with computer-generated models, the method comprising:
   receiving, at one or more computer systems, information defining a set of controls for a computer-generated model;
   receiving, at the one or more computer systems, information providing a description of each control in the set of controls;
   receiving, at the one or more computer systems, information providing an example of use of each control in the set of controls;
   storing a body of knowledge associated with at least one rig for the computer-generated model in a storage device associated with the one or more computer systems based on the information defining the set of controls, the description of each control, and the example of use of each control; and
   generating, with the one or more processors associated with the one or more computer systems, one or more graphical user interfaces associated with a first application that are configured to display a combined view of artistic content and technical content for the at least one rig for the computer-generated model that is derived from the body of knowledge, wherein at least one of the one or more graphical user interfaces associated with the first application includes functionality to interact with the set of controls in a manner substantially similar to one or more graphical user interfaces associated with a second application that is configured to natively create controls in the set of controls.

2. The method of claim 1 further comprising receiving information at the computer system designating the rig as a standard rig.

3. The method of claim 1 wherein receiving the information defining the set of controls for the model comprises receiving a hierarchy of controls at the computer system.

4. The method of claim 1 wherein receiving the information providing the description of each control comprises receiving a description of the functionality of each control at the computer system.

5. The method of claim 1 wherein receiving the information providing the description of each control comprises receiving a description of the purpose of each control at the computer system.

6. The method of claim 1 wherein receiving the information providing an example of use of each control comprises receiving a set of images depicting use of the control with a computer-generated model.

7. The method of claim 1 wherein receiving the information providing an example of use of each control comprises receiving a movie depicting use of the control with a computer-generated model.

8. The method of claim 1 further comprising:
receiving, at the computer system, a set of annotations made by an articulator for a control in the set of controls; and
incorporating the set of annotations into the body of knowledge for the at least one rig.

9. The method of claim 1 further comprising:
receiving, at the computer system, a set of annotations made by an animator the computer-generated model; and
incorporating the set of annotations into the body of knowledge for the at least one rig.

10. The method of claim 1 wherein the second application is a modeling tool.

11. The method of claim 1 further comprising:
generating one or more graphical user interfaces using the computer system based on the body of knowledge for the at least one rig that enable a user to interact with a control in the set of controls to view the description of the control.

12. The method of claim 1 further comprising:
generating one or more graphical user interfaces using the computer system based on the body of knowledge for the at least one rig that enable a user to interact with a control in the set of controls to view the example of use of the control.

13. The method of claim 1 further comprising:
receiving, at the computer system, a set of electronic communications associated a control in the set of control; and
incorporating the set of electronic communications into the body of knowledge for the at least one rig using the computer system.

14. The method of claim 1 further comprising:
generating one or more graphical user interfaces using the computer system based on the body of knowledge for the at least one rig that display a notification associated with a control in the set of controls.

15. The method of claim 1 further comprising:
generating one or more graphical user interfaces using the computer system based on the body of knowledge for the at least one rig that enable electronic communication relevant to a control in the set of controls.

16. The method of claim 1 further comprising:
generating one or more graphical user interfaces using the computer system based on the body of knowledge for the at least one rig that enable a user to edit information in the body of knowledge about a control in the set of controls.

17. The method of claim 1 further comprising:
generating one or more graphical user interfaces using the computer system that enable a user to associate an electronic document with a control in the set of controls.

18. A computer-readable storage medium configured to store computer-executable code for performing the method recited in claim 1.

19. A system for creating rigging for computer-generated models, the system comprising:
a database configured to store a body of knowledge associated with at least one rig for a computer-generated model;
a processor; and
a memory configured to store a set of instructions which when executed by the processor cause the processor to:
receive information defining a set of controls for the computer-generated model;
receive information providing a description of each control in the set of controls;
receive information providing an example of use of each control in the set of controls;
store the body of knowledge associated with the at least one rig for the computer-generated model based on the information defining the set of controls, the description of each control, and the example of use of each control; and
generate one or more graphical user interfaces associated with a first application that are configured to display a combined view of artistic content and technical content for the at least one rig for the computer-generated model that is derived from the body of knowledge, where in at least one of the one or more graphical user interfaces associated with the first application includes functionality to interact with the set of controls in a manner substantially similar to one or more graphical user interfaces associated with a second application that is configured to natively create controls in the set of controls.

20. A method for collaborating to define a computer-generated model, the method comprising:
accessing a body of knowledge associated with at least one rig using a user interface generated by a computer system, the body of knowledge for the at least one rig specifying at least information defining a set of controls for a computer-generated character, information proving a description of each control, and information providing an example of use of each control, the user interface configured to display a combined view of artistic content and technical content for the at least one rig that is derived from the body of knowledge;
interacting with the body of knowledge for the at least one rig via the user interface provided by the computer system to formalize artistic content associated with the computer-generated character and technical content associated with the computer-generated character; and
storing artistic content and the technical content using the computer system.

21. The method of claim 20 wherein the at least one rig comprises a standard rig.

22. The method of claim 20 wherein formalizing the artist content or the technical content occurs in substantially real time using the computer system.

23. The method of claim 20 wherein interacting with the body of knowledge for the at least one rig comprises associating a multimedia document with the body of knowledge using the user interface.

24. The method of claim 20 wherein interacting with the body of knowledge for the at least one rig comprises associating a record of a meeting between an animator and an articulator relevant to the computer-generated character using the user interface.

25. The method of claim 24 wherein the record comprises audio information or video information captured from the meeting.

26. The method of claim 24 wherein the record comprises meeting notes.

27. A computer-readable storage medium configured to store computer-executable code for performing the method of claim 20.

28. A system for collaborating to define a computer-generated model, the system comprising:
means for accessing a body of knowledge associated with at least one rig using a user interface generated by a computer system, the body of knowledge for the at least one rig specifying at least information defining a set of controls for a computer-generated character, information proving a description of each control, and information providing an example of use of each control, the user interface configured to display a combined view of artistic content and technical content for the at least one rig that is derived from the body of knowledge;

means for interacting with the body of knowledge for the at least one rig via the user interface provided by the computer system to formalize a set of definitions of artistic content associated with the computer-generated character;

means for interacting with the body of knowledge for the at least one rig via the user interface provided by the computer system to formalize a set of definitions of technical content associated with the computer-generated character; and means for storing the definitions of artistic content and the definitions of technical content.

* * * * *